United States Patent
Sjöberg et al.

(10) Patent No.: US 12,003,718 B2
(45) Date of Patent: Jun. 4, 2024

(54) VIDEO CODING COMPRISING RECTANGULAR TILE GROUP SIGNALING

(71) Applicant: Telefonaktiebolaget LM Ericsson (publ), Stockholm (SE)

(72) Inventors: Rickard Sjöberg, Stockholm (SE); Mitra Damghanian, Upplands-Bro (SE); Martin Pettersson, Vallentuna (SE); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 169 days.

(21) Appl. No.: 17/437,779

(22) PCT Filed: Mar. 5, 2020

(86) PCT No.: PCT/SE2020/050247
§ 371 (c)(1),
(2) Date: Sep. 9, 2021

(87) PCT Pub. No.: WO2020/185146
PCT Pub. Date: Sep. 17, 2020

(65) Prior Publication Data
US 2023/0072874 A1    Mar. 9, 2023

Related U.S. Application Data

(60) Provisional application No. 62/816,563, filed on Mar. 11, 2019.

(51) Int. Cl.
*H04N 19/119* (2014.01)
*H04N 19/136* (2014.01)
(Continued)

(52) U.S. Cl.
CPC ......... *H04N 19/119* (2014.11); *H04N 19/136* (2014.11); *H04N 19/176* (2014.11); *H04N 19/70* (2014.11)

(58) Field of Classification Search
None
See application file for complete search history.

(56) References Cited

U.S. PATENT DOCUMENTS

| 9,026,615 B1 * | 5/2015 | Sirton ................. H04N 19/593 |
| | | 709/217 |
| 2008/0126278 A1 * | 5/2008 | Bronstein ............ H04N 19/567 |
| | | 706/17 |

(Continued)

OTHER PUBLICATIONS

Deshpande et al., "On Tile Grouping," Joint Video Experts Team (JVET) of ITU-T SG 16 WP 3 and ISO/IEC JTC 1/SC 29/WG 11, 13th Meeting: Marrakech, Morocco, Jan. 9-18, 2019, Document: JVET-M0853-v2. (Year: 2019).*

(Continued)

*Primary Examiner* — Reza Aghevli
(74) *Attorney, Agent, or Firm* — Rothwell, Figg, Ernst & Manbeck, P.C.

(57) ABSTRACT

A method for decoding a picture from a bitstream. The method includes decoding a tile partition structure from one or more syntax elements in the bitstream. The method includes determining a number of tiles N in the picture. The method includes decoding a number of partitions in the picture, wherein each partition comprises an integer number of tiles. The method includes deriving a size and/or location for a current partition, wherein deriving the size and/or location for the current partition comprises: decoding one or more location syntax elements for the current partition from the bitstream, deriving a top-left position of the current partition as a location of a first tile in raster scan order that is not included in one or more previously derived partition, and deriving the size and/or the location of the current partition from a value of the one or more location syntax element together with a size and/or location of the one or more (Continued)

more previously derived partition. The method includes using the derived size and/or location to decode the picture.

16 Claims, 20 Drawing Sheets

(51) Int. Cl.
  *H04N 19/176* (2014.01)
  *H04N 19/70* (2014.01)

(56) References Cited

U.S. PATENT DOCUMENTS

| | | | |
|---|---|---|---|
| 2009/0323809 A1* | 12/2009 | Raveendran | H04N 19/137 375/E7.104 |
| 2011/0055290 A1* | 3/2011 | Li | G06F 16/29 707/E17.005 |
| 2013/0101035 A1 | 4/2013 | Wang et al. | |
| 2014/0086330 A1* | 3/2014 | Zhou | H04N 19/172 375/240.24 |
| 2014/0301464 A1* | 10/2014 | Wu | H04N 19/436 375/240.15 |
| 2014/0341276 A1* | 11/2014 | Lee | H04N 19/70 375/240.03 |
| 2015/0078454 A1 | 3/2015 | Henry et al. | |
| 2015/0110118 A1* | 4/2015 | Ouedraogo | H04L 65/75 370/394 |
| 2017/0332080 A1* | 11/2017 | Houze | H04N 19/184 |
| 2019/0082178 A1* | 3/2019 | Kim | H04N 19/174 |
| 2020/0029080 A1* | 1/2020 | Kim | H04N 19/82 |
| 2020/0267386 A1* | 8/2020 | Chen | G06T 1/60 |
| 2021/0204000 A1* | 7/2021 | Wang | H04N 19/96 |
| 2021/0368190 A1* | 11/2021 | Sjöberg | H04N 21/2343 |
| 2023/0072874 A1* | 3/2023 | Sjöberg | H04N 19/136 |

OTHER PUBLICATIONS

He et al., "AHG12: On Rectangular Tile Group," Joint Video Experts Team (JVET) of ITU-T SG 16 WP 3 and ISO/IEC JTC 1/SC 29/ WG 11, 13th Meeting: Marrakech, Morocco, Jan. 9-18, 2019, Document: JVET-M0121r1 (Year: 2019).*
Chen et al., "AHG17: Flexible tile grouping for VVC," Joint Video Experts Team (JVET) of ITU-T SG 16 WP 3 and ISO/IEC JTC 1/SC 29/WG 11, 13th Meeting: Marrakech, Morocco, Jan. 9-18, 2019, Document: JVET-M0160-v2. (Year: 2019).*
International Search Report and Written Opinion dated May 20, 2020 in International Application No. PCT/SE2020/050247 (15 pages total).
International Preliminary Report on Patentability dated Jul. 1, 2021 in International Application No. PCT/SE2020/050247 (14 pages total).
Second Written Opinion dated Mar. 12, 2021 in International Application No. PCT/SE2020/050247 (4 pages total).
Deshpande, S. et al., "AHG12: On Tile Grouping", Joint Video Experts Team (JVET) of ITU-T SG 16 WP 3 and ISO/IEC JTC 1/SC 29/WG 11, Document: JVET-M0853-v2, 13th Meeting: Marrakech, MA, Jan. 9-18, 2019 (8 pages total).
Chen, L. et al., "AHG17: Flexible tile grouping for VVC", Joint Video Experts Team (JVET) of ITU-T SG 16 WP 3 and ISO/IEC JTC 1/SC 29/WG 11, Document: JVET-M0160-v2, 13th Meeting: Marrakech, MA, Jan. 9-18, 2019 (8 pages).
He, Y. et al., "AHG12: On Rectangular Tile Group", Joint Video Experts Team (JVET) of ITU-T SG 16 WP 3 and ISO/IEC JTC 1/SC 29/WG 11, Document: JVET-M0121r1, 13th Meeting: Marrakech, MA, Jan. 9-18, 2019 (9 pages total).
Sjöberg, R. et al., "AHG12: Rectangular tile group address signaling", Joint Video Experts Team (JVET) of ITU-T SG 16 WP 3 and ISO/IEC JTC 1/SC 29/WG 11, Document: JVET-N0496-v3, 14th Meeting: Geneva, CH, Mar. 19-27, 2019 (5 pages total).
Bross, B. et al., "Versatile Video Coding (Draft 3)", Joint Video Experts Team (JVET) of ITU-T SG 16 WP 3 and ISO/IEC JTC 1/SC 29/WG 11, Document: JVET-L1001-v9, 12th Meeting: Macao, CN, Oct. 3-12, 2018 (235 pages total).
Sullivan, G. et al., "Meeting Report of the 13th meeting of the Joint Video Experts Team (JVET), Marrakech, MA, Jan. 9-18, 2019", Joint Video Experts Team (JVET) of ITU-T SG 16 WP 3 and ISO/IEC JTC 1/SC 29/WG 11, Document: JVET-M_Notes_dA9, 13th Meeting: Marrakech, MA, Jan. 9-18, 2019 (289 pages total).
Deshpande, S. et al., "AHG12: On Tile Grouping", Joint Video Experts Team (JVET) of ITU-T SG 16 WP 3 and ISO/IEC JTC 1/SC 29/WG 11, Document: JVET-M0853, 13th Meeting: Marrakech, MA, Jan. 9-18, 2019 (8 pages).
He, Y. et al., "AHG12: On Rectangular Tile Group", Joint Video Experts Team (JVET) of ITU-T SG 16 WP 3 and ISO/IEC JTC 1/SC 29/WG 11, Document: JVET-M0121r1, 13th Meeting: Marrakech, MA, Jan. 9-18, 2019 (9 pages).
Sjöberg, R. et al., "AHG12: Rectangular tile group address signaling", Joint Video Experts Team (JVET) of ITU-T SG 16 WP 3 and ISO/IEC JTC 1/SC 29/WG 11, Document: JVET-N0496, (XP030205021), 14th Meeting: Geneva, CH, Mar. 19-27, 2019 (3 pages).
Sjöberg, R. et al., "AHG12: Rectangular tile group address signaling", JVET-N0496, (XP030205017) Mar. 19, 2019 (11 pages).
Qualcomm Incorporated, Capas De Salida Diana En Codificación De Video, Oct. 30, 2015 (SIPI No. 15123422) (102 pages).
Hendry, Y.K. W. et al., "On tile grouping", Document: JVET-M0130-v1, Joint Video Experts Team (JVET) of ITU-TSG 16 WP 3 and ISO/IEC JTC 1/SC 29/WG 11, 13th Meeting: Marrakech, MA, Jan. 9-18, 2019 (7 pages).

* cited by examiner

VIDEO CODING COMPRISING RECTANGULAR TILE GROUP SIGNALING

CROSS REFERENCE TO RELATED APPLICATIONS

This application is a 35 U.S.C. § 371 National Stage of International Patent Application No. PCT/SE2020/050247, filed Mar. 5, 2020, which claims priority to U.S. provisional application No. 62/816,563, filed on Mar. 11, 2019. The above identified applications are incorporated by reference.

TECHNICAL FIELD

This disclosure relates to High Efficiency Video Coding (HEVC) and Versatile Video Coding (VVC).

BACKGROUND

HEVC and the Next Generation Video Coding

High Efficiency Video Coding (HEVC), a.k.a. H.265, is a block-based video codec standardized by ITU-T and MPEG that utilizes both temporal and spatial prediction. Spatial prediction is achieved using intra (I) prediction from within the current picture. Temporal prediction is achieved using inter (P) or bi-directional inter (B) prediction on the block level using previously decoded reference pictures. The difference between the original sample or pixel data and the predicted sample or pixel data, referred to as the residual, is transformed into the frequency domain, quantized and then entropy coded before transmitted together with necessary prediction parameters such as prediction mode and motion vectors, that are also entropy coded. By quantizing the transformed residuals, a tradeoff between bitrate and quality of the video may be controlled. The level of quantization is determined by the quantization parameter (QP). A decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VCC).

Components

A video sequence consists of a series of pictures where each picture consists of one or more components. Each component can be described as a two-dimensional rectangular array of sample values. It is common that a picture in a video sequence consists of three components; one luma component Y where the sample values are luma values and two chroma components Cb and Cr, where the sample values are chroma values. It is common that the dimensions of the chroma components are smaller than those of the luma components by a factor of two in each dimension. For example, the size of the luma component of an HD picture would be 1920×1080 and the chroma components would each have the dimension of 960×540. Components are sometimes referred to as color components.

Blocks

A block is one two-dimensional array of samples. In video coding, each component is split into blocks and the coded video bitstream consist of a series of blocks. It is common in video coding that the picture is split into units that cover a specific area of the picture. Each unit consists of all blocks from all components that make up that specific area and each block belongs fully to one unit. The macroblock in H.264 and the Coding unit (CU) in HEVC are examples of units.

Coding tree units

In HEVC, each picture is partitioned into coding tree units (CTU). A CTU consists of an N×N block of luma samples and two M×M corresponding chroma blocks. A CTU in HEVC is like macroblocks in H.264 and earlier standards but in contrast to macroblocks the CTU size is configurable. Most often, however, the CTU size in HEVC is set to 64×64 luma samples. Each CTU can be recursively quadtree split. The root of the quadtree is then associated with the CTU. The quadtree is split until a leaf is reached, which is referred to as the coding unit (CU). A CU in HEVC always consists of a luma block with equal height and width. How each CTU is split is conveyed in the bitstream.

NAL units

Both HEVC and VVC define a Network Abstraction Layer (NAL). All the data, i.e., both video and non-video data of HEVC and VVC is encapsulated in NAL units. The NAL units can be seen as packets suitable for transport and storage. The NAL unit begins with a NAL unit header, which among other things contains the NAL unit type that identifies what type of data is carried in the NAL unit. The NAL unit type is transmitted in the nal_unit_type codeword in the NAL unit header and the type indicates and defines how the NAL unit should be parsed and decoded. A bitstream consists of a series of concatenated NAL units.

Parameter Sets

HEVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs.

Tiles

The HEVC video coding standard includes a tool called tiles that divides a picture into rectangular spatially independent regions. Using tiles, a picture in HEVC can be partitioned into rows and columns of samples where a tile is an intersection of a row and a column. The tiles in HEVC are always aligned with CTU boundaries.

Slices in HEVC

The concept of slices in HEVC divides the picture into independently coded slices, where each slice is read in raster scan order in units of CTUs. Each slice is encapsulated in its own NAL unit. Different coding types could be used for slices of the same picture, i.e., a slice could either be an I-slice, P-slice or B-slice. The main purpose of slices is to enable resynchronization in case of data loss.

Tile Groups in VVC

The draft VVC specification does not include slices but a similar concept called tile groups. In HEVC a tile may contain one or more slices, or a slice may contain one or more tiles, but not both of those. In VVC, the concept is more straightforward; a tile group may contain one or more complete tiles. A tile group is used to group multiple tiles to reduce the overhead of each tile. Each tile group is encapsulated in its own NAL unit. For a picture, the tile groups may either be of rectangular shape or comprise one or more tiles in raster scan order. A rectangular tile group consists of V×H tiles where V is the number of tiles vertically and H the number of tiles horizontally in the tile group.

Tile Grouping in JVET-M0853

At a recent WET meeting, rectangular tile grouping was adopted according to the JVET-M0853 proposal. The proposed text as in JVET-M0853 is shown below. The changes with respect to Versatile Video Coding (Draft 3) specified in JVET-L1001-v7, Macao, December 2018 are shown below. Specifically, the added portions are underlined and the removed portions are crossed through.

equal to 1 specifies that tiles within each tile group cover a rectangular region of the picture and the tile group information is signalled in the PPS. When single_tile_per_tile_group flag is equal to 1 rect_tile_group_flag is inferred to be equal to 1.

num_tile_groups_in_pic_minusl plus 1 specifies the number of tile groups in each picture referring to the PPS. The value of num_tile_groups_in_pic_minus1 shall be in the range of 0 to (NumTilesInPic−1), inclusive. When not present and single_tile_per_tile_group_fla is equal to 1, the value of num_tile_groups_in_pic_minus1 is inferred to be equal to (NumTilesInPic−1).

top_left tile idx[i] specifies the tile index of the tile located at the top-left corner of the i-th tile group. The value of top_left_tile_idx[i] shall not be equal to the value of top_left_tile_idx[j] for any i not equal to j. When not

| | Descriptor |
|---|---|
| pic_parameter_set_rbsp( ) { | |
|   pps_pic_parameter_set_id | ue(v) |
|   pps_seq_parametere_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
| ~~}~~ | |
| ~~if( !single_tile_in_pic_flag ) {~~ | |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|   <u>*single_tile_per_tile_group_flag*</u> | <u>*u(1)*</u> |
|   <u>*if(!single_tile_per_tile_group_flag )*</u> | |
|     <u>*rect_tile_group_flag*</u> | <u>*u(1)*</u> |
|   <u>*If( rect_tile_group_flag && !single_tile_per_tile_group_flag ) {*</u> | |
|     <u>*num_tile_groups_in_pic_minus1*</u> | <u>*ue(v)*</u> |
|     <u>*for( i = 0; i <= num_tile_groups_in_pic_minus1; i++ ) {*</u> | |
|       <u>*if( i > 0)*</u> | |
|         <u>*top_left_tile_idx[ i ]*</u> | <u>*u(v)*</u> |
|       <u>*bottom_right_tile_idx[ i ]*</u> | <u>*u(v)*</u> |
|     <u>*}*</u> | |
|   <u>*}*</u> | |
|   loop_filter_across_tiles_enabled_flag | u(1) |
| } | |
| <u>*if( rect_tile_group_flag ) {*</u> | |
|   <u>*signalled_tile_group_id_flag*</u> | <u>*u(1)*</u> |
|   <u>*if( signalled_tile_group_id_flag ) {*</u> | |
|     <u>*signalled_tile_group_id_length_minus1*</u> | <u>*ue(v)*</u> |
|     for( i = 0; i <= num_<u>*tile_groups_in_pic_minus1; i++ )*</u> | |
|       <u>*tile_group_id[ i ]*</u> | <u>*u(v)*</u> |
| <u>*}*</u> | |
|   rbsp_trailing_bits( ) | |
| } | |

The semantics for the new/modified elements indicated above are shown below.

single_tile_per_tile_group equal to 1 specifies that each tile group that refers to this PPS includes one tile. single_tile_per_tile_group equal to 0 specifies that a tile group that refers to this PPS may include more than one tile.

rect_tile_group_flag equal to 0 specifies that tiles within each tile group are in raster scan order and the tile group information is not signalled in PPS. rect_tile_group_flag present, top_left_tile_idx[i] is inferred to be equal to i. The length of the top_left_tile_idx[i] syntax element is Ceil (Log2(NumTilesInPic) bits.

bottom_right_tile_idx[i] specifies the tile index of the tile located at the bottom-right corner of the i-th tile group. When single_tile_per_tile_group_flag is equal to 1 bottom_right_tile_idx[i] is inferred to be equal to top_left_tile_idx [i]. The length of the bottom_right_tile_idx[i] syntax element is Ceil(Log2(NumTilesInPic)) bits.

It is a requirement of bitstream conformance that any particular tile shall only be included in one tile group.

The variable NumTilesInTileGroup[i], which specifies the number of tiles in the tile group, and related variables, are derived as follows:

```
deltaTileIdx[ i ] = bottom_right_tile_idx[ i ] - top_right_tile_idx[ i ]
NumTileRowsInTileGroupMinus1[ i ] = ( deltaTileIdx[ i ] / ( num_tile_columns_minus1 + 1
) )
NumTileColumnsInTileGroupMinus1[ i ] =
( deltaTileIdx[ i ] % ( num_tile_columns_minus1 + 1 ) )
NumTilesInTileGroup[ i ] = ( NumTileRowsInTileGroupMinus1[ i ] + 1 ) *
   (NumTileColumnsInTileGroupMinus1[ i ] + 1 )
``` signalled_tile_group_id_flag equal to 1 specifies that the tile group ID for each tile group is signalled. signalled_tile_group_index_flag equal to 0 specifies that tile group IDs are not signalled. When rect_tile_group_flag is equal to 0, the value of signalled_tile_group_index_flag is inferred to be equal to 0.

signalled_tile_group_id_length_minus1 plus 1 specifies the number of bits used to represent the syntax element tile_group_id[i] when present, and the syntax element tile_group_address in tile group headers. The value of signalled_tile_group_index length minus1 shall be in the range of 0 to 15, inclusive. When not present, the value of signalled tile group index length minus1 is inferred to be equal to Ceil(Log2(num_tile_groups_in_pic_minus1+1))–1.

tile_group_id[i] specifies the tile group ID of the i-th tile group. The length of the tile_group_id[i] syntax element is tile_set_id_length_minus1+1 bits. When not present, tile_group_id[i] is inferred to be equal to i, for each i in the range of 0 to num_tile_groups_in_pic_minus1, inclusive.

SUMMARY

In an aspect, there is provided a method for decoding a picture from a bitstream. The method includes decoding a tile partition structure from one or more syntax elements in the bitstream. The method includes determining a number of tiles N in the picture. The method includes decoding a number of partitions in the picture, wherein each partition comprises an integer number of tiles. The method includes deriving a size and/or location for a current partition, wherein deriving the size and/or location for the current partition comprises: decoding one or more location syntax elements for the current partition from the bitstream, deriving a top-left position of the current partition as a location of a first tile in raster scan order that is not included in one or more previously derived partition, and deriving the size and/or the location of the current partition from a value of the one or more location syntax element together with a size and/or location of the one or more previously derived partition. The method includes using the derived size and/or location to decode the picture.

In some embodiments, the current partition is a tile group.

In some embodiments, the tile partition structure comprises at least three rectangular partitions, wherein at least one boundary of at least one rectangular partition has parts in common with at least two other rectangular partitions.

In some embodiments, one or more previously derived partitions were derived in raster scan order.

In some embodiments, the partition structure has, when decoded, each of its entire left boundary and entire top boundary at a picture boundary or a neighboring one or more previously decoded partitions.

In some embodiments, the one or more location syntax elements comprises a syntax element representing a tile index, wherein the tile index is a number in the range of 0 to N-1, inclusive, and wherein N indicates the number of tiles in the picture and the tile index indicates a location of a bottom-right tile of the current partition.

In some embodiments, the one or more location syntax elements comprises one syntax element representing a y-coordinate of a location of a bottom-right tile of the current partition and one syntax element representing an x-coordinate of the location of the bottom-right tile of the current partition. In some embodiments, deriving the size and/or the location of the current partition comprises deriving a bottom right location of the current partition based on the coordinate values.

In some embodiments, the one or more location syntax elements comprises one syntax element representing a width of the current partition in number of tiles and one syntax element representing a height of the current partition in number of tiles. In some embodiments, deriving the size and/or the location of the current partition comprises deriving a bottom right location of the current partition, wherein deriving the bottom right location of the current partition comprises adding the values of the width and height syntax elements to a derived top left location of the current partition.

In some embodiments, syntax elements are not decoded if the current partition is the last rectangular partition in raster scan order.

In some embodiments, the one or more location syntax elements comprises one or more syntax elements specifying the distance between the bottom-right corner of the current partition and a point B where point B is determined by previously signaled rectangular partitions.

In some embodiments, a stack data structure is used for determining the position of rectangular partitions in the picture.

In some embodiments, an array data structure is used for determining the position of the rectangular partitions in the picture.

In some embodiments, a recursive method is used for partitioning the picture into rectangular partitions.

In some embodiments, the method includes initializing a list L of size N, wherein list L comprises N entries, wherein each entry in list L corresponds to a tile in the picture and the one or more entries are arranged in raster scan order such that the n-th entry in L corresponds to the n-th tile in the picture in raster scan order, and wherein each of the N entries in list L is initialized to a value representing that the corresponding tile does not belong to a partition; deriving a top-left position of the current partition, wherein deriving the top-left position of the current partition comprises executing a for loop over the elements in list L until an entry with a value representing that the corresponding tile does not belong to a partition is found; identifying tiles included in the current partition using the derived top-left position and the bottom right location; and updating the list L such that entries in list L that correspond to the tiles that belong to the current partition are set to a value representing that the corresponding tile does belong to a partition.

In some embodiments, position of a bottom-right corner of rectangular partition i in the picture is restricted to a rectangular area defined by other rectangular partitions j in the scan order where j<i.

In some embodiments, width and height of rectangular partition i in the picture is restricted to a rectangular area defined by other rectangular partitions j in the scan order where j<i.

In some embodiments, the address or the location of the bottom-right corner of rectangular partition i in the picture is restricted to a subset of the addresses defined by other rectangular partitions j in the scan order where j<i.

In some embodiments, the spatial partition structure is signaled by one or more syntax elements specifying the distance of the bottom-right corner to a point B for each rectangular partition, wherein the point B is fixed.

In some embodiments, deriving a size and/or location for a current partition comprises deriving which tiles in the picture belong to the current partition.

In some embodiments, there is provided a computer program comprising instructions which, when executed by processing circuitry, causes the processing circuitry to perform any of the methods described above.

In some embodiments, there is provided a decoder adapted to perform any of the methods described above.

In some embodiments, deriving the top-left position of the current partition is done without decoding any syntax elements dedicated to indicating the top-left location.

In another aspect, there is provided a method for encoding a picture into a bitstream. The method includes encoding a tile partition structure as one or more syntax elements in the bitstream. The method includes determining a number of tiles N in the picture. The method includes encoding a number of partitions in the picture, wherein each partition comprises an integer number of tiles. The method includes deriving a size and/or location for a current partition, wherein deriving the size and/or location for the current partition comprises: encoding one or more location syntax elements for the current partition into the bitstream, deriving a top-left position of the current partition as a location of a first tile in raster scan order that is not included in one or more previously derived partition, and deriving the size and/or the location of the current partition from a value of the one or more location syntax element together with a size and/or location of the one or more previously derived partition. The method includes using the derived size and/or location to encode the picture.

In some embodiments, a rectangular partition comprises a tile group.

In some embodiments, the tile partition structure comprises at least three rectangular partitions, wherein at least one boundary of at least one rectangular partition has parts in common with at least two other rectangular partitions.

In some embodiments, the one or more previously derived partitions have been derived in raster scan order.

In some embodiments, the one or more location syntax elements comprises a syntax element representing a tile index, wherein the tile index is a number in the range of 0 to N-1, inclusive, and wherein N indicates the number of tiles in the picture and the tile index indicates a location of a bottom-right tile of the current partition.

In some embodiments, the one or more location syntax elements comprises one syntax element representing a y-coordinate of a location of a bottom-right tile of the current partition and one syntax element representing an x-coordinate of the location of the bottom-right tile of the current partition, and a bottom right location of the current partition is derived from the coordinate values.

In some embodiments, the one or more location syntax elements comprises one syntax element representing a width of the current partition in number of tiles and one syntax element representing a height of the current partition in number of tiles, and a bottom right location of the current partition is derived by adding the values of the width and height syntax elements to a derived top left location of the current partition.

In some embodiments, the one or more location syntax elements comprises one or more syntax elements specifying the distance between the bottom-right corner of the current partition and a point B where point B is determined by previously signaled rectangular partitions.

In some embodiments, a stack data structure is used for determining the position of rectangular partitions in the picture.

In some embodiments, an array data structure is used for determining the position of the rectangular partitions in the picture.

In some embodiments, a recursive method is used for partitioning the picture into rectangular partitions.

In some embodiments, the method further includes initializing a list L of size N, wherein list L comprises N entries, wherein each entry in list L corresponds to a tile in the picture and the one or more entries are arranged in raster scan order such that the n-th entry in L corresponds to the n-th tile in the picture in raster scan order, and wherein each of the N entries in list L is initialized to a value representing that the corresponding tile does not belong to a partition; deriving a top-left position of the current partition, wherein deriving the top-left position of the current partition comprises executing a for loop over the elements in list L until an entry with a value representing that the corresponding tile does not belong to a partition is found; identifying tiles included in the current partition using the derived top-left position and the bottom right location; and updating the list L such that entries in list L that correspond to the tiles that belong to the current partition are set to a value representing that the corresponding tile does belong to a partition.

In some embodiments, the position of a bottom-right corner of rectangular partition i in the picture is restricted to a rectangular area defined by other rectangular partitions j in the scan order where j<i.

In some embodiments, the width and height of rectangular partition i in the picture is restricted to a rectangular area defined by other rectangular partitions j in the scan order where j<i.

In some embodiments, the address or the location of the bottom-right corner of rectangular partition i in the picture is restricted to a subset of the addresses defined by other rectangular partitions j in the scan order where j<i.

In some embodiments, the spatial partition structure is signaled by one or more syntax elements specifying the distance of the bottom-right corner to a point B for each rectangular partition, wherein the point B is fixed.

In some embodiments, deriving a size and/or location for a current partition comprises deriving which tiles in the picture belong to the current partition.

In some embodiments, there is provided a computer program comprising instructions which, when executed by processing circuitry, causes the processing circuitry to perform any of the methods described above.

In some embodiments, there is provided an encoder adapted to perform any of the methods described above.

Some embodiments disclosed herein include a novel signaling of the tile group layout. In some embodiments, the location of a current tile group is derived based on previously signaled and derived tile group locations instead of signaling both the top-left and bottom-right positions of each tile group. One embodiment contains both novel syntax and novel derivation methods.

By deriving the location of tile groups based on previously signaled and derived tile group locations, the embodiments disclosed herein are more efficient than the current solutions in terms of bit cost.

In some embodiments, deriving the size and/or location for a current partition may consist of deriving which tiles in the picture that belong to the current partition. This may be realized by indicating for each tile T in the picture which partition tile T belong to, for example by assigning values to a list of length N (where N is the number of tiles in the picture) where each entry in the list is a partition number such that the list associates each of the N tiles with a partition.

Some embodiments disclosed herein additionally provide means for rectangular tile groups to comply with the requirements specified in JVET-M_Notes_dA and specifically guarantee the rectangular tile group partition to include only tile groups that when decoded, in the defined address order, each tile shall have its entire left boundary and entire top boundary consisting of a picture boundary or previously decoded tile(s). The desired requirement for forbidding pale yellow and light green tile groups in a picture will be met using embodiments disclosed herein.

For a decoder, the embodiments disclosed herein simplify processing, since the decoder does not have to check that the bit stream is following these rules. Instead, any possible signaling will automatically follow the rules.

BRIEF DESCRIPTION OF THE DRAWINGS

The accompanying drawings, which are incorporated herein and form part of the specification, illustrate various embodiments.

FIG. 13A shows a raster scan order according to some embodiments.

FIG. 13B shows a Z-order according to some embodiments.

DETAILED DESCRIPTION

The support of rectangular tile groups was adopted in the 13th JVET meeting in Marrakech, in January 2019. At the same meeting, a number of constraints were set for rectangular tile groups. Parts of the meeting notes in during the 13th JVET meeting (JVET-M_Notes_dA) which specify these constraints are reproduced below:
1. the tiles in a tile group need to be in raster-scan order;
2. the tile groups need to be in increasing address order (see below: dark orange, then light blue, then pale yellow, then dark blue, then light orange, . . . );
3. The tile group shapes shall be such that each tile, when decoded, shall have its entire left boundary and entire top boundary consisting of a picture boundary or previously decoded tile(s). In other words, the light yellow and light green tiles in the figure below are not allowed.

It is noted that the "see below" and "figure below" quoted above is referring to FIG. 1 of the current disclosure. The order mentioned in the second bullet above as "the increasing address order for the tile groups" is illustrated by numbers marking the tile groups in FIG. 1. Tile group marked 1 is the first in the order, followed by tile group marked 2, followed by tile group marked 3, etc. It is further noted that, in the third bullet above, tile groups 3 and 7 are referred to as "light yellow and light green tiles," but JVET_M_Notes_dA likely meant to refer to "pale yellow and light green tile groups" instead of "light yellow and light green tiles." Finally, it is noted that JVET_M_Notes_dA uses similar colors for different tile groups, e.g., two dark blue tile groups and two grey tile groups.

Figure 1:
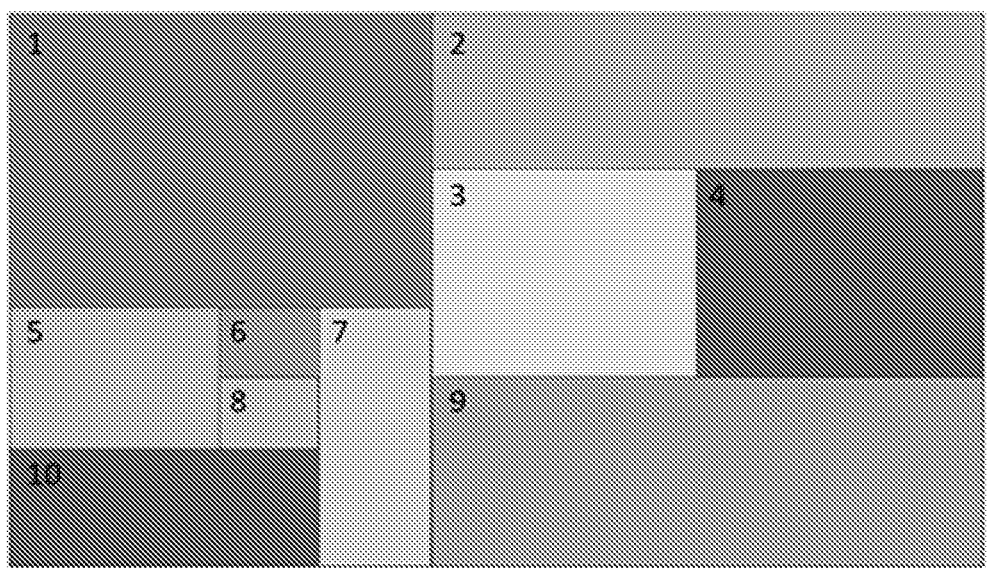
FIG. 1 shows a picture with tile groups according to some embodiments.

For the purpose of explanation in the context of the current disclosure, the constraints quoted above in the JVET_M_Notes_dA are rephrased as shown below:

Constraint 1. the tiles in a tile group, as shown in FIG. 1, need to be in raster-scan order. Referring to FIG. 1, tile group 1 represents a dark orange tile group, tile group 2 represents a light blue tile group, tile group 3 represents a pale yellow tile group, tile group 4 represents a dark blue tile group, tile group 5 represents a light orange tile group, tile group 6 represents a grey tile group, tile group 7 represents a light green tile group, tile group 8 represents a dark green tile group, tile group 9 represents a grey tile group, and tile group 10 represents a dark blue tile group.

Constraint 2. the tile groups need to be in increasing address order. The increasing address order for the tile groups is illustrated by numbers associated with each tile group as shown in FIG. 1. For example, dark orange tile group 1 is the first in the order, followed light blue tile group 2, followed by pale yellow tile group 3, and so on, as shown in FIG. 1.

Constraint 3. The tile group shapes shall be such that each tile, when decoded, shall have its entire left boundary and entire top boundary consisting of a picture boundary or previously decoded tile(s). In other words, the pale yellow tile group 3 and light green tile group 7 in FIG. 1 are not allowed.

The proposed syntax and semantics in JVET-M0853 for signaling rectangular tile groups do not comply with the partitioning constraint and specifically the third constraint (noted above) specified in the meeting notes in Marrakech (JVET-M_Notes_dA). For JVET-M0853, the constraints from the meeting notes need to be included. But this would mean that the syntax and semantics of JVET-M0853 are not as efficient as they need to be. By designing the syntax and semantics with the constraints listed above in mind, the embodiments disclosed herein provide a more efficient signaling of the tile group layout.

In one aspect, there is provided a method for signaling the partition structure which inherently allows only partition structures that comply with the tile-group partitioning structure requirement specified in the VVC meeting notes in Marrakech. These requirements are quoted from the meeting notes JVET-M_Notes_dA as shown above as Constraints 1-3.

In the context of the current disclosure, the term partition structure refers to different interpretations of the tile-grouping structure, tile-group partitioning structure, non-grid-based tile partitioning structure etc. In some embodiments, a partition may refer to a tile group.

In an embodiment, it is assumed that the width and the height of the picture and the number of partitions are known.

In the embodiments below, various methods have been described that solves the problems with the conventional methods described above.

In the context of the current disclosure, a boundary indicates an entire side of a rectangular partition, picture, and/or tile in some embodiments. In the context of the current disclosure, a border of a picture indicates a picture boundary in some embodiments.

Embodiment 1. General Concept

In a first embodiment, the decoding of one or more pictures comprises deriving spatial locations of multiple rectangular partitions. The derivation is done by first decoding the number of partitions the picture(s) consist of and then deriving the locations and/or sizes of each partition from syntax elements in the bitstream and from knowledge about the locations and/or sizes of partitions for which the locations and/or sizes have already been derived. This is done by first deriving the location and/or size for the first partition in the picture by decoding one or more syntax elements from the bitstream. The order of derivation and the order of the syntax elements in the bitstream are in a determined order, preferably in a tile raster scan order. This means that the first partition in the picture to be derived must include the first tile in the picture in raster scan order. It also means that the second partition in the picture to be derived must include the first tile in raster scan order that is not included in the first partition. In general, the $n^{th}$ partition in the picture must include the first tile in raster scan order that is not included in any of the partitions that preceded the $n^{th}$ partition. This property is used in the derivation of the location and/or size of a current partition by using the property to derive the top-left location of the current partition without decoding any syntax elements dedicated to indicating the top-left location.

A decoder may perform all or a subset of the following steps for this embodiment to decode a picture:

1. Decode a tile partitioning structure from one or more syntax elements in the bitstream. The syntax is preferably located in a picture parameter set.

2. Determine the number of tiles there are in the picture from syntax elements in the bitstream. The syntax is preferably located in a picture parameter set.

3. Decode the number of partitions there are in the picture where each partition consists of an integer number of tiles. The partitions may all be rectangular in shape such that the size of each partition can be described by a height and width in terms of number of tiles. For example, a partition may have a height of 3 tiles and a width of 4 tiles. A partition may here be a tile group.

4. Derive the size and/or location for a current partition by the following sub steps:
   a. decode one or more location syntax elements for the current partition from the bitstream;
   b. derive the size and/or the location of the current partition from the value(s) of the location syntax element(s) together with the size(s) and/or location(s) of previously derived partitions, wherein any subset of the following may apply:
      i. The top-left position of the current partition is derived as the location of the first tile in a tile scan order that is not included in any previously derived partitions whether the scan order may be a raster scan order
      ii. The current partition has at least one boundary that has parts in common with at least two other partitions where a boundary is one side of the partition.
      iii. Each of the top and left boundaries of a current partition is either at the picture boundary or is bordering one or more previously derived partitions where a boundary is one side of the current partition.
      iv. The number of previously derived partitions is larger than 2
      v. The width and height of at least one previously derived partition is not equal to the width and height of the current partition
      vi. The previously derived partitions have been derived in raster scan order 5. Use the derived sizes and/or locations to decode the picture.

In some embodiments, the tiles within the current partition may later be decoded in tile raster scan order within the current partition.

Embodiment 2. Signaling the Bottom-Right Corner Only

In a second embodiment, the location of the current partition from Embodiment 1 is signaled by one or more syntax elements specifying the position of one corner of the current partition. In some embodiments, the position of one corner may be specified, e.g., as x and y relative to an origin or, e.g., as an address.

The signaled syntax for the current partition may specify the address or the location of the bottom-right corner of the current partition and the partitions are derived in raster scan order. Then a unique position of the current partition is derived from previously derived partitions in raster scan order and the signaled syntax value. In an embodiment, the partitions are scanned in raster scan order, based on the locations of the top-left corners of the partitions.

(a) The signaled syntax value for deriving the bottom-right corner of the current partition may be restricted to a range that guaranties that each partition, when decoded, has each of its entire left boundary and entire top boundary at a picture boundary or neighboring one or more previously decoded partitions. A boundary is in this disclosure preferably an entire side of a rectangular partition. The range of allowed addresses for the bottom-right corner of the current partition may be specified as addresses inside a rectangular region (shown in diagonal stripes in the following figure) with the top-left corner $T=(X_T, Y_T)$ equal to the top-left corner of the current rectangular partition and the bottom-right corner equal to the point $B=(X_B, Y_B)$ defined as follows:

(b) If T is located on the left border of the picture, B is equal to the bottom right corner of the picture.

Figure 2:
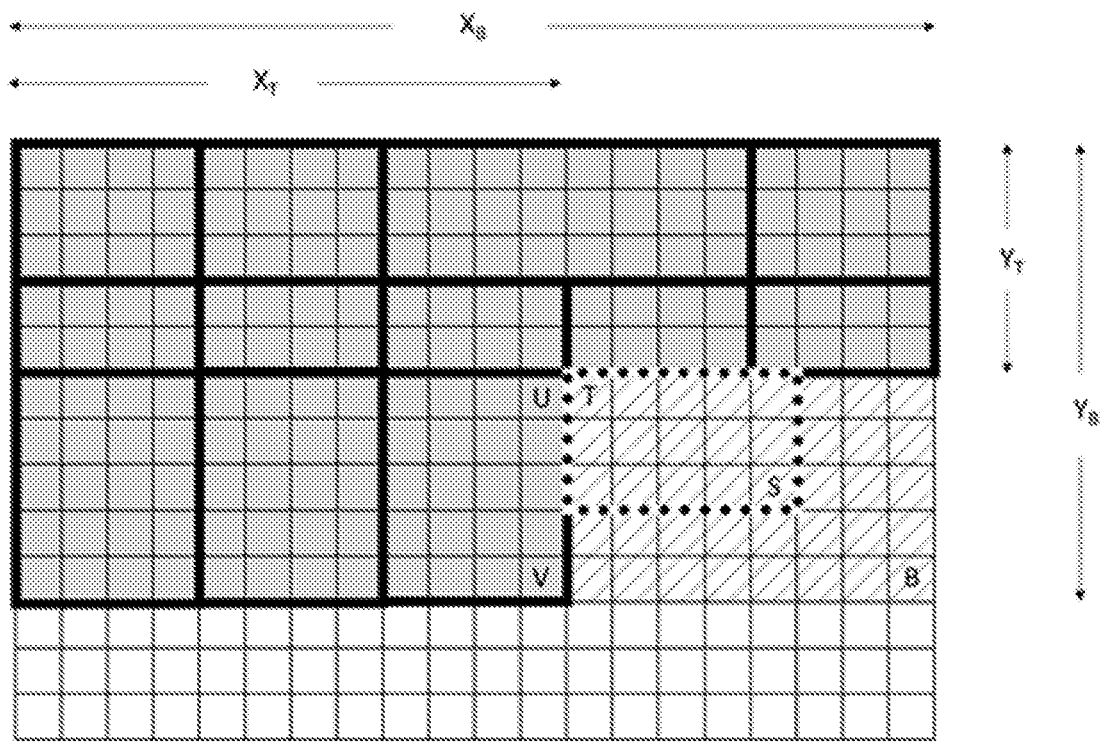
FIG. 2 shows a picture with tile groups according to some embodiments.

(c) If T is not located on the left border of the picture, the following applies: as illustrated in FIG. 2, the first tile in the current partition is marked with T and has coordinates $(X_T, Y_T)$. The tile immediately to the left of it is marked with U, and has coordinates $(X_T-1, Y_T)$. The tiles underneath U will have coordinates $(X_T-1, Y_T+k)$, k>0. Let V be the tile with the largest k such that it is still part of the same partition as U. Then the point B (marked with B) will have coordinates $(X_B, Y_B)$, where $X_B$ is the width of the picture in tiles, and where $Y_B=Y_T+k$.

In FIG. 2, the grey part shows the area that has been partitioned and the rest (the striped part and the white part) is the area to be partitioned. The striped part in FIG. 2 shows the range of allowed points for the bottom-right corner of the current partition. If tile S is signaled, the current partition will be the rectangle marked with the dotted outline, in which T is the top left tile and S is the bottom right tile.

As shown in FIG. 2, the striped area shows the possible positions for the bottom right coordinates of the current partition. The top left tile T is the first tile in raster scan order that is not already part of a partition. The bottom right tile B is the tile that has the same y-coordinate $Y_B$ as tile V, which is the bottom most tile in the partitioning containing U. The x-coordinate of tile B is the right edge of the picture. As shown in FIG. 2, the coordinates of tile S has been signaled as the bottom right tile of the current partition and the current partition is marked with the dotted rectangle.

Figure 3:
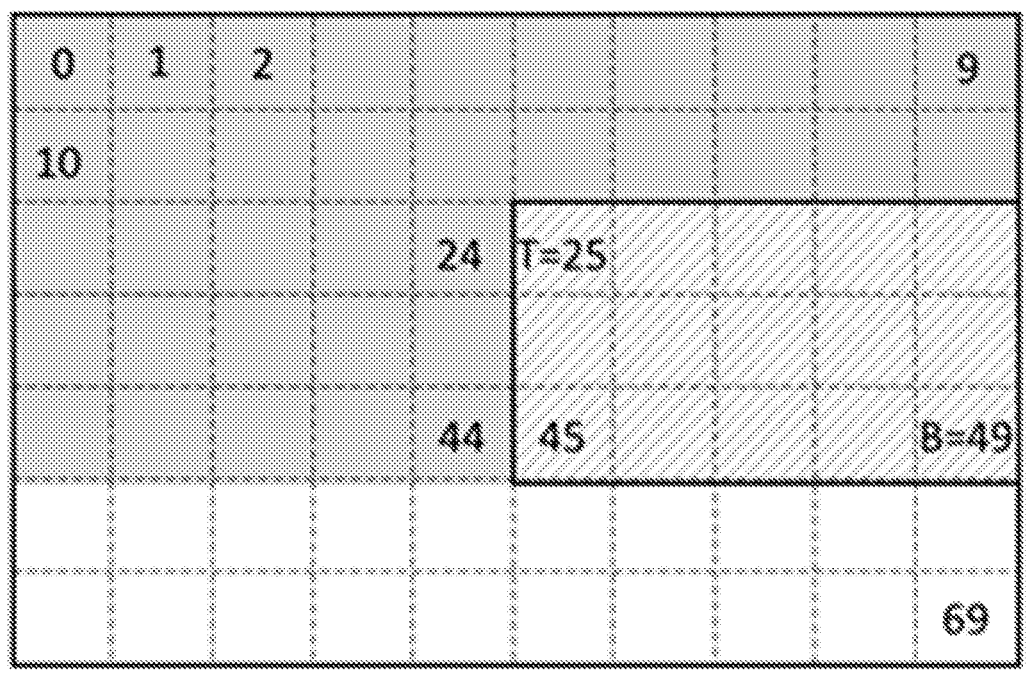
FIG. 3 shows a picture with tile groups according to some embodiments.

In another variant of this embodiment, the position of the bottom-right corner for the current partition is specified as an address value. An example is illustrated in the FIG. 3 where the grey part shows the area that has been partitioned and the rest (the striped part and the white part) shows the area to be partitioned. The striped part shows the allowed positions for the bottom-right corner of the current partition and the position of the bottom right corner of the current partition is specified as an address value inside the striped rectangle with top-left corner address equal to 25 and the bottom-right corner equal to 49 in this example.

Figure 4:
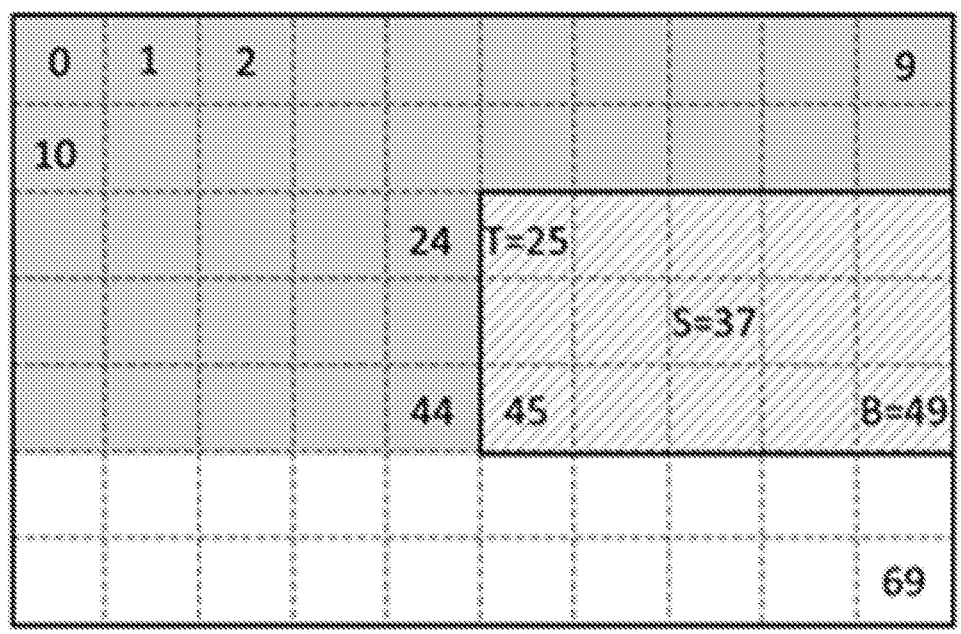
FIG. 4 shows a picture with tile groups according to some embodiments.

In another variant of this embodiment the position of the bottom-right corner for the current partition is specified relative to the top-left corner of the current partition. An example is illustrated in FIG. 4. In this example, the top-left corner of the current partition is marked as T and the bottom-right corner is marked as S and the position of the bottom-right corner S for the current partition is specified relative to the top-left corner T of the current partition and the value S−T=37−25=12 is signaled.

In another variant of this embodiment, the position of the bottom-right corner S for the current partition is specified relative to the top-left corner T of the current partition utilizing that the position of S must be inside the striped part. This is done by signaling a value representing the number of tiles in raster scan order inside the striped are there are from T to S. In FIG. 4, that number is equal to 7.

In another variant of this embodiment, the last rectangular partition in the picture may be inferred from the rest of the partitioning structure and so no syntax element may be signaled for the last partition.

A decoder may perform all or a subset of the steps 1 to 5 described above in the Embodiment 1 for this second embodiment to decode a picture where decoding one or more location syntax elements for the current partition from the bitstream comprises one of the following:

(a) Decode a syntax element specifying a tile index, where the tile index is a number in the range of 0 to N-1, inclusive, where N is the number of tiles in the picture. The tiles in the picture are numbered from 0 to N-1 in raster scan order and the decoded tile index identifies the tile being numbered with the tile index. The identified tile specifies the location of the bottom-right tile of the current partition. The syntax element specifying the tile index may specify the location of the bottom-right tile relative to the top-left corner of the current partition. The code word to specify the tile index may be signaled using a fixed length code of ceil(log2(n)) bits or may be signaled using a UVLC code word. The bottom right location of the current partition is then derived from the tile index.

(b) Decode a syntax element specifying a number N of tiles in raster scan order within the allowed area illustrated as a striped area. The tiles in the picture are numbered from 0 to n-1 in raster scan order. A bottom-right tile for the current partition is identified by starting a scan of the tiles within the allowed area in raster scan order from the top-left corner T. The scan is stopped after N tiles have been scanned and the tile where the scan ends is identified as the bottom-right tile for the current partition. The bottom right location of the current partition is then set to the coordinates or tile index for the identified bottom-right tile.

(c) Decode one syntax element specifying a y-coordinate of the location of the bottom-right tile of the current partition and decode one syntax element specifying an x-coordinate of the location of the bottom-right tile of the current partition. The coordinates may be relative to the top-left corner of the picture or may be relative to another location, including but not restricted to the top-left corner T of the rectangular region as explained above. The bottom right location of the current partition is then derived from decoded coordinates.

Embodiment 3. Signaling the Width and Height

In a third embodiment, the size of the current partition from Embodiment 1 is signaled by one or more syntax elements specifying the width and height of the current partition structure.

The signaled syntax may specify the width and height of the current partition and a unique position of the current partition may be derived from previously derived partitions in raster scan order. In a preferred embodiment, the partitions are scanned in a predefined order, such as raster scan order, based on the locations of the top-left corners of the partitions.

The syntax for the current partition may consist of one width syntax element and one height syntax element where the width syntax element represents the width of the current partition in number of tiles and the height syntax element represents the height of the current partition in number of tiles. The width syntax element may be signaled using a fixed length code of ceil(log2(W)) bits where W is the number of tile columns in the picture or the number of tile columns in the picture minus 1. Similarly, the height syntax element may be signaled using a fixed length code of ceil(log2(H)) bits where H is the number of tile rows in the picture or the number of tile rows in the picture minus 1.

Figure 5:
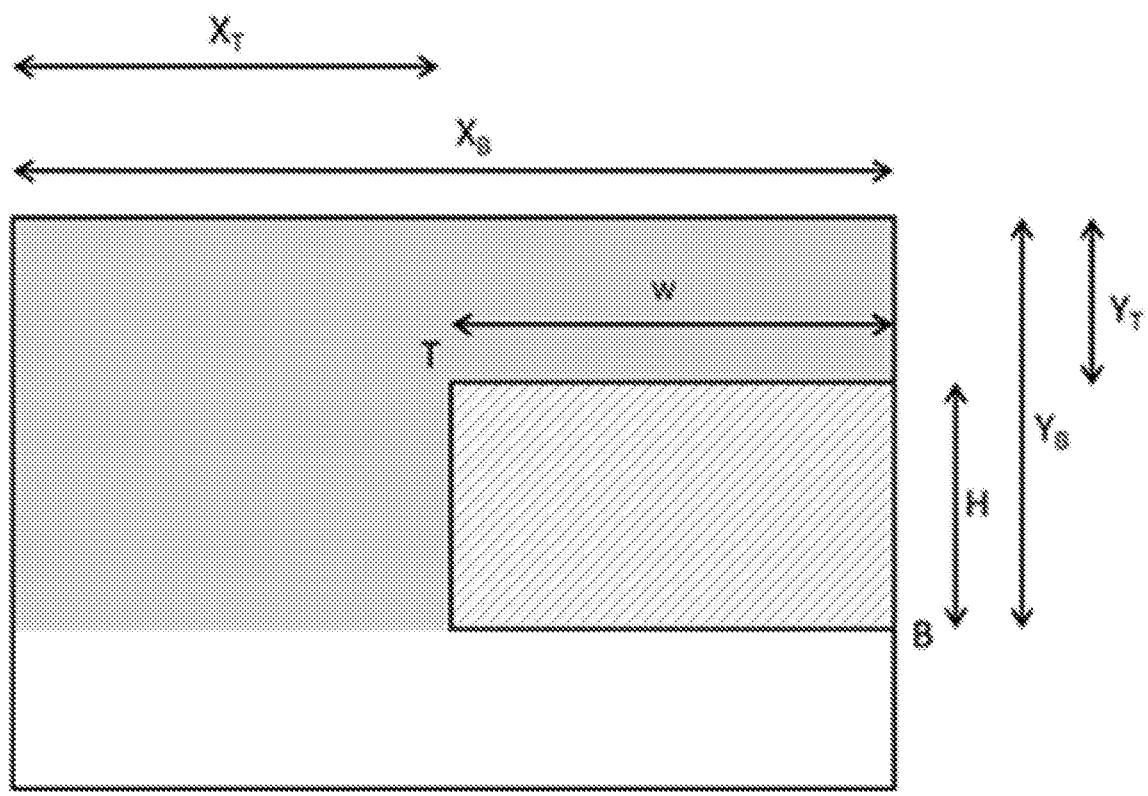
FIG. 5 shows a picture with tile groups according to some embodiments.

The signaled syntax value for deriving the width and height of the current partition may be restricted to a range that guarantees that each partition, when decoded, has each of its entire left boundary and entire top boundary at a picture boundary and/or neighboring one or more previously decoded partitions. The range of allowed values may be specified as values inside a rectangular region (shown in diagonal stripes in FIG. 5) with width W equal to $X_B-X_T$ and height H equal to $Y_B-Y_T$. In FIG. 5, $T=(X_T,Y_T)$ is the top-left corner and $B=(X_B,Y_B)$ is the bottom-right corner of the rectangular region used for determining the allowed values for W and H. T may be derived from the previously partitioned area and the known scan order and B may be defined as follows:

(a) If T is located on the left border of the picture, then B is equal to the bottom right corner of the picture.

(b) If T is not located on the left border of the picture, then B is located on the right border of the picture and in the furthest row from the top border of the picture, for which $(X_T-1, Y_T)$ and $(X_B-W-1, Y_B)$ belong to the same rectangular partition.

In FIG. 5, the grey part shows the area that has been partitioned and the rest (the striped part and the white part) is the area yet to be partitioned.

In a variant of this embodiment the last rectangular partition in the scan order may be inferred from the rest of the partitioning structure and so no syntax element may be signaled for it.

A decoder may perform all or a subset of the steps 1 to 5 described in Embodiment 1 for this third embodiment to decode a picture where the decoding one or more location syntax elements for the current partition from the bitstream comprises the following:

(a) Decode one syntax element representing the width of the current partition in number of tiles and decode one syntax element representing the height of the current partition in number of tiles. The bottom right location of the current partition is then derived by adding the decoded height and width of the current partition to the derived top left location of the current partition.

Embodiment 4. Signaling the Distance to Position B

In a fourth embodiment, the location of the current partition from Embodiment 1 is signaled by one or more syntax elements specifying the position of one corner of the current partition and the position of this corner may be specified relative to a point B where the point B is derived from one or more previously derived partitions. For the first rectangular partition the point B may have a default value e.g. representing the bottom-right location of the picture.

In the context of the current disclosure, the following notations are used for a tile T:
T: name of the tile
$(X_T, Y_T)$: coordinates for tile T
$A_T$: address (raster scan index) of tile T.
The signaled syntax for the current partition may specify the address or the location of a bottom-right corner of the current partition when the partitions are derived in raster scan order. Then a unique position of the current partition may be derived from previously derived partitions in raster scan order and the signaled syntax value specifying the bottom-right corner of the current partition. In an embodiment, the partitions are scanned in raster scan order, based on the locations of the top-left corners of the partitions.

Figure 6:
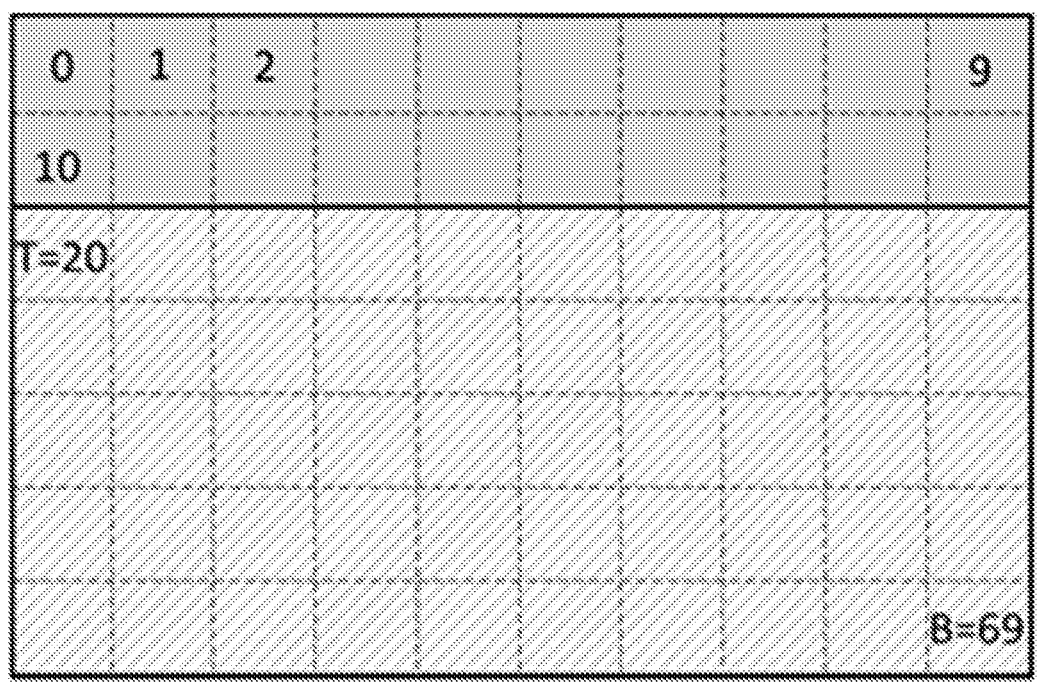
FIG. 6 shows a picture with tile groups according to some embodiments.

The signaled syntax value for deriving the bottom-right corner of the current partition may be restricted to a range that guarantees that the current partition, when decoded, has each of its entire left boundary and entire top boundary at a picture boundary or neighboring one or more previously derived partitions. The range of allowed values for the bottom-right corner of the current partition may be specified as values inside a rectangular region (shown in diagonal stripes in the FIG. 6) with the top-left corner T as the top-left corner of the current rectangular partition and the bottom-right corner B defined as follows:

(a) If T is located on the left border of the picture (e.g. T=20 in FIG. 6), B is equal to the bottom right corner of the picture (B=69 in FIG. 6).

If T is not located on the left border of the picture (e.g. $A_T$=25 in FIG. 7), then B indicates a block positioned in the rightmost block column of the picture and AB is the highest value for which $(A_T-1)$ and $(A_B-W)$ belong to the same rectangular partition, where W is the width of the rectangular region. W is known since the width of the picture and the position of T is known. In the following example, W=5 and we have $A_T-1$=24 and $A_B-W$=44.

Figure 7:
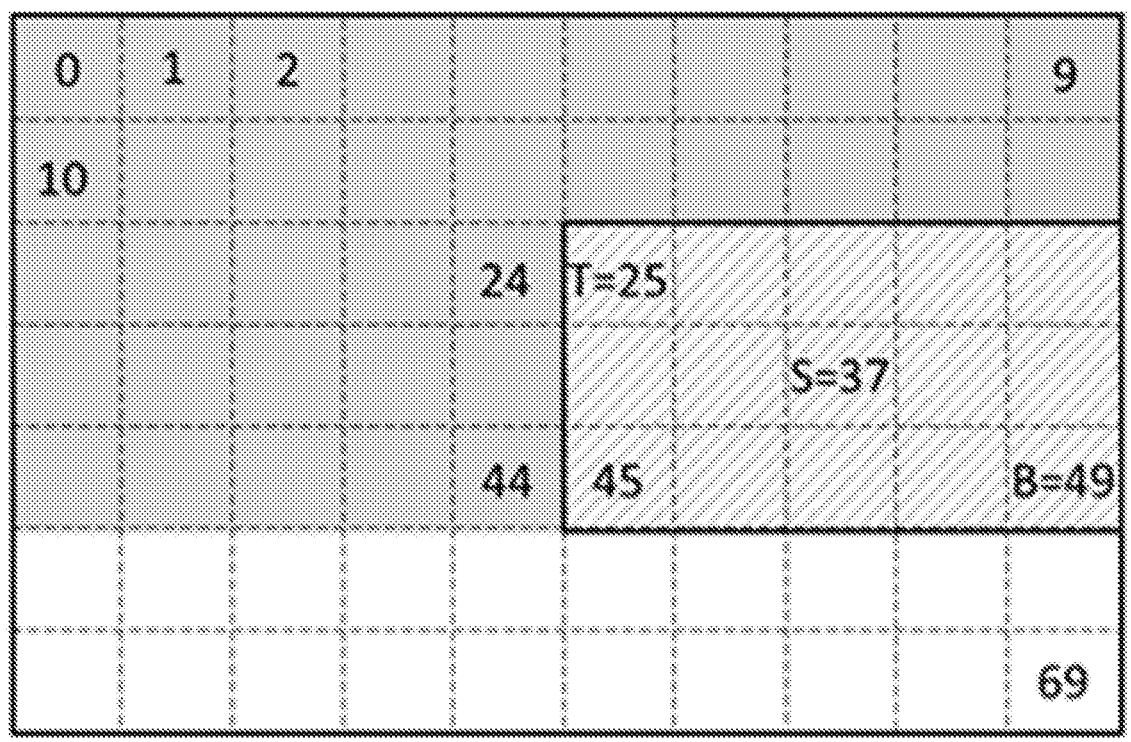
FIG. 7 shows a picture with tile groups according to some embodiments.

In FIGS. 6-7, the grey part shows the area that has been partitioned and the rest (the striped part and the white part) is the area to be partitioned.

The location of a bottom-right position of the current partition may be derived by subtracting a decoded value signaled for the current partition from the tile index value of position B (69 and 49 in FIGS. 6 and 7, respectively). In the example with S=37 showing the location of the bottom-right location of the current partition, the location is derived by subtracting a value 32 from 69, where 32 is signaled in the bitstream. Alternatively, a value representing a number N of tiles in reverse raster scan order within the allowed area is decoded. A bottom-right tile for the current partition is identified by starting a scan of the tiles within the allowed area in inverse raster scan order from tile B. The scan is stopped after N tiles have been scanned and the tile where the scan ends is identified as the bottom-right tile for the current partition. In the example above with S=37 the value representing a number N of tiles in reverse order is equal to 7. The bottom right location of the current partition is then set to the coordinates or tile index for the identified bottom-right tile.

In another variant of this embodiment, the position of the bottom-right corner for the current partition is specified as an address value.

In another variant of this embodiment, the last rectangular partition in the scan order may be inferred from the rest of the partitioning structure and so no syntax element may be signaled for it.

Embodiment 5. Process Using a Stack

In a fifth embodiment, a stack is created and used for determining the position of the current partition in the picture. Each entry in the stack may contain information to define a rectangular partition. The position of the current partition may be specified with the position of two opposite corners of the rectangle partition, e.g. the top-left corner and the bottom-right corner of the rectangle partition, or by specifying the width and length of the rectangular partition or other means.

Figure 8:
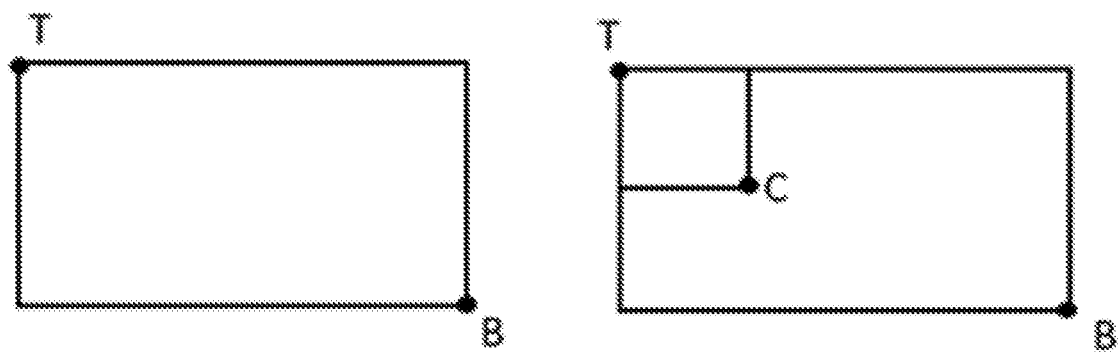
FIG. 8 shows stacks according to some embodiments.

In this embodiment, the stack may be a last-in-first-out (LIFO) stack and each entry to the stack may consist of the position of the top-left corner (specified as T in FIG. 8) and the corresponding potential bottom-right corner of the current partition structure specified as B in FIG. 8. The point C is the actual bottom-right corner of the corresponding rectangular partition. The point B is defined as potential bottom-right corner because any point like C in the rectangular region defined with T as the top-left corner and B as the bottom-right corner can be defined as the actual bottom-right corner of the current partition in the next step.

Figure 9:
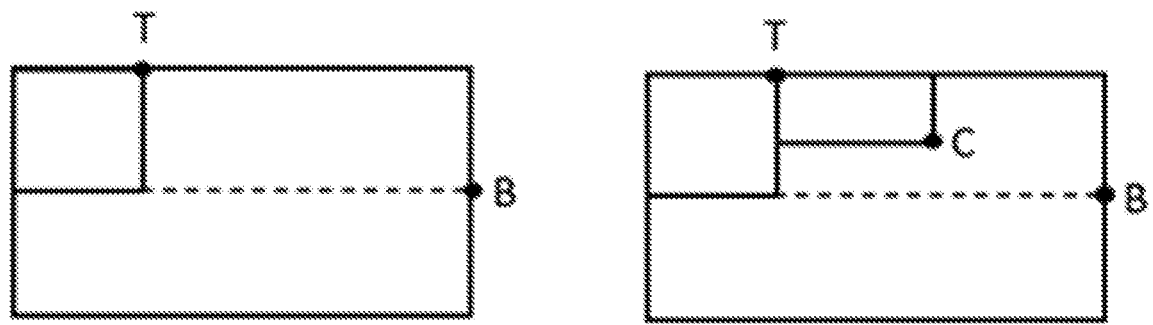
FIG. 9 shows stacks according to some embodiments.

FIG. 9 shows another pair of top-left (T) corner and potential bottom-right corner (B). The point C again shows one example of the actual bottom-right corner of the corresponding rectangular partition.

The rectangular partitions are in increasing address order and the stack may be updated after each rectangular partition is derived. The update may include removing entries or adding new entries to the stack. The actual bottom-right corner position for each rectangular partition may be derived from the stacked information and the signaled information syntax for each rectangle in the partition structure.

Figure 10:
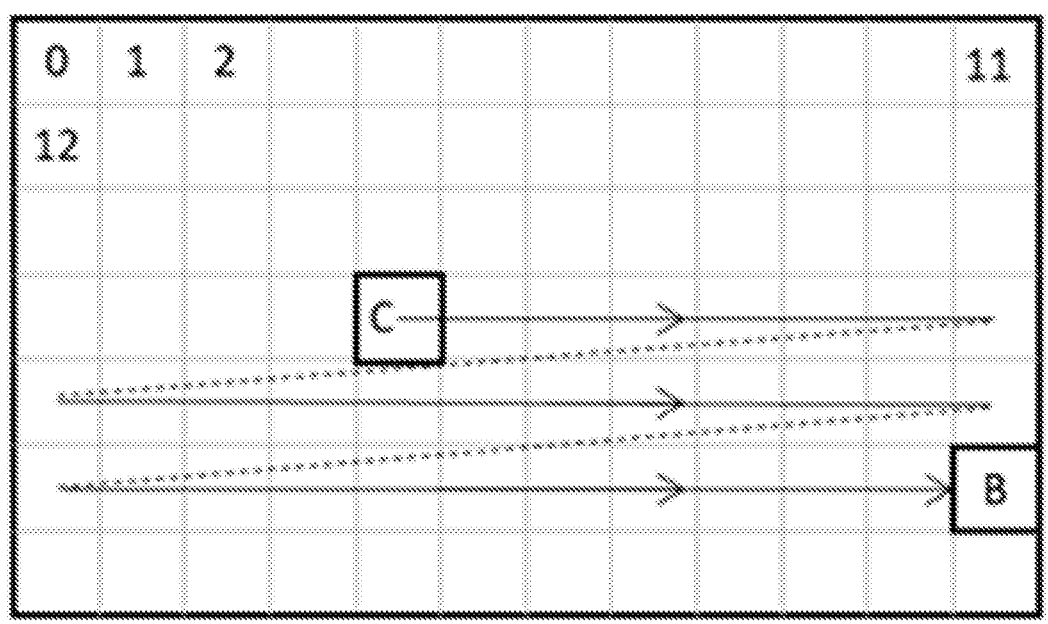
FIG. 10 shows a picture with units according to some embodiments.

In one variant of this embodiment, the distance between the potential bottom-right point and the actual bottom-right point is signaled using one codeword. An example shown in FIG. 10 illustrates the distance between the potential point (B) and the actual point (C) as the number of units in the scan order from C to B. In this embodiment the actual position of the point may be calculated using the signaled value and the picture width.

In another variant of this embodiment, the distance between the potential point and the actual point is signaled using two codewords; one for the horizontal and one for the vertical distance. In the example shown in FIG. 11, one codeword (X) specifies the distance between the potential point (B) and the actual point (C) in horizontal direction and the second codeword (Y) specifies the distance between the potential point (B) and the actual point (C) in vertical direction. The codeword X may be FLC with length equal to ceil(log2(picture_width)) and the codeword Y can be FLC with length equal to ceil(log2(picture_height)).

Figure 11:
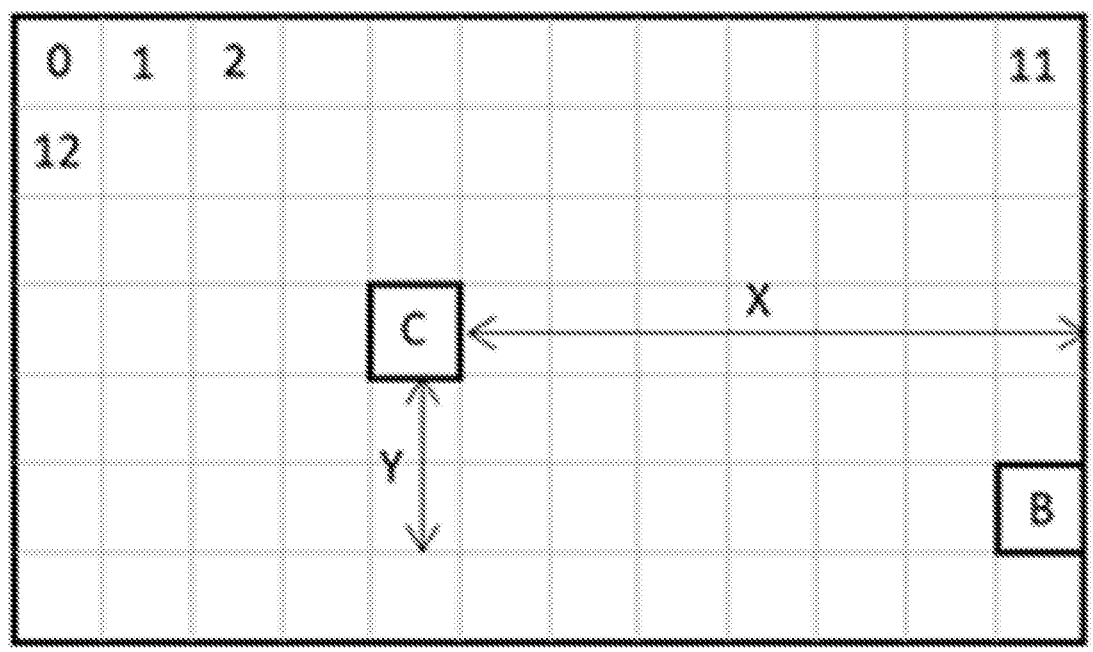
FIG. 11 shows a picture with units according to some embodiments.

The two cases shown in FIGS. 10-11 are interchangeable knowing the width of the picture.

In one variant of this embodiment, only the difference between the potential position of the bottom-right corner (B, kept in the stack) and the desired bottom-right corner (C) is signaled for each rectangular partition (e.g. rectangular tile group) instead of the width and height for each rectangular partition (e.g. rectangular tile group). This way the desired bottom-right corner position is obtained from the potential position of the bottom-right corner (out from the stack) and the signaled difference value. After this step, the stack is updated with the next potential pairs of top-left and bottom-right corners.

In some embodiments, a decoder may perform all or a subset of the following:

1. Initialize a stack with two entries and picture size as the potential top-left and bottom-right corner of the first rectangular partition;

2. For each rectangular partition in the address ordered list of the rectangular partitions (maybe except the last) do the following: a) Parse the syntax element(s) specifying the difference between the potential and the desired bottom-right corner of the current partition from a video bitstream; b) determine the position of the rectangular partition in the picture using the stack information and the parsed syntax element; c) update the stack by possibly adding new entries for future possible top-left and bottom-right corner positions of the partitions in the picture.

3. Decode the picture or part of the picture according to the rectangular partition structure, wherein the rectangular partition structure contains at least one rectangular partition that has its entire left boundary and entire top boundary consisting of a picture boundary or previously decoded rectangular partition.

The table below shows an exemplary syntax for Embodiment 1 on top of JVET-M0853. Modifications over JVET-M0853 are marked where added syntax is underlined and removed portions are crossed through.

|  | Descriptor |
| --- | --- |
| pic_parameter_set_rbsp( ) { |  |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { |  |
|     num_tile_columns_minus1 | ue(v) |
|     num_tile_rows_minus1 | ue(v) |
|     uniform_tile_spacing_flag | u(1) |
|     if( !uniform_tile_spacing_flag ) { |  |
|       for( i = 0; i < num_tile_columns_minus1; i++ ) |  |
|         tile_column_width_minus1[ i ] | ue(v) |
|       for( i = 0; i < num_tile_rows_minus1; i++ ) |  |
|         tile_row_height_minus1[ i ] | ue(v) |
|     } |  |
|     single_tile_per_tile_group_flag | u(1) |
|     if(!single_tile_per_tile_group_flag ) |  |
|       rect_tile_group_flag | u(1) |
|     if( rect_tile_group_flag && !single_tile_per_tile_group_flag ) { |  |
|       num_tile_groups_in_pic_minus1 | ue(v) |
|       for( i = 0; i <= num_tile_groups_in_pic_minus1; i++ ) { |  |
|         ~~if( i > 0 )~~ |  |
|         ~~top_left_tile_idx[ i ]~~ | ~~u(v)~~ |
|         ~~bottom_right_tile_idx[ i ]~~ | ~~u(v)~~ |
|         _bottom_right_tile_offset[ i ]_ | _u(v)_ |
|       } |  |

|  | Descriptor |
|---|---|
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |
|       for( i = 0; i <= num_tile_groups_in_pic_minus1; i++ ) | |
|         tile_group_id[ i ] | u(v) |
|   } | |
|   rbsp_trailing_bits( ) | |
| } | |

Semantics for new/modified elements are shown below.

bottom_right_tile_offset[i] specifies the bottom-right corner of i-th tile group using the following process (the unit for calculations is tile number in the tile grid, A is a list of potential top-left corners of the next rectangular partitions, and B is a list of potential bottom-right corner of the next rectangular partitions):

```
index = 0
A[ index ] = 0
B[ index ] = num_tiles_minus1
for (i = 0, i < num_tile_groups, i++ ) {
%Determine the tile_group[ i ] top-left and bottom-right
   tile_group_top_left[ i ] = A[ index ]
   tile_group_bottom_right[ i ] = B [ index ] - bottom_right_tile_offset[ i ]
   index--
%Determine the tile_group[ i ] width and height, not necessary, but useful for later steps
   tile_group_height[ i ] = ( (tile_group_bottom_right[ i ] - tile_group_top_left[ i ] ) /
   num_tile_columns ) + 1
   tile_group_width[ i ] = (tile_group_bottom_right [ i ] - tile_group_top_left [ i ] ) - ( (
   tile_group_height[ i ] -
   1 ) * num_tile_columns ) + 1
%Add new potential (top-left, bottom-right) pairs to the lista A and B, starting from the
furthest.
%First checking the tile below the bottom-left corner to be inside the picture and the tile
before
the bottom-left corner is not a bottom-right corner to any previous rectangular partition. If
the
condition holds, then add the tile below the bottom-left corner to the list A as the next
potential
start point and the next potential bottom-end point stays the same.
   b = true
   for (j = 0, j < i, j++ )
      if (tile group bottom right [ i ] - tile_group_width[ i ] = tile_group_bottom_right[ j ] )
{
      b = false }
   if (tile_group_bottom_right [ i ] + num_tile_columns - tile_group_width[ i ] + 1 <
   num_tiles_in_pic
   and b) {
      index++
      A[ index ] = tile_group_bottom_right [ i ] + num_tile_columns - tile_group_width[ i ]
+ 1
      B[ index ] = tile_group_bottom_right[ i ] + bottom_right_tile_offset[ i ]
      % B[ index ] stays as the previous potential bottom right
   }
%Second checking the tile after the top-right corner is not located at the left border of the
picture, if the condition holds, then add the tile after the top-right corner to lists A and B as
the
next potential start point.
   if (tile_group_top_left[ i ] + tile_group_width[ i ] is not divisible by num_tile_columns) {
      index++
      A[ index ] = tile_group_top_left[ i ] + tile_group_width[ i ]
      B[ index ] = ceil( (tile_group_bottom_right [ i ] + 1 ) ÷ num tile columns ) *
      num_tile_column - 1
      %B is set to the index of the tile at the end of the last row of this tile_group
   }
}
```

The code listed above without embedded comments is provided below:

```
A[ index ] = 0
B[ index ] = num tiles minus1
for (i = 0, i < num_tile_groups, i++ ) {
   tile_group_top_left[ i ] = A[ index ]
   tile_group_bottom_right[ i ] = B [ index ] - bottom_right_tile_offset[ i ]
   index--
   tile_group_height[ i ] = ( (tile_group_bottom_right[ i ] - tile_group_top_left[ i ] ) /
   num_tile_columns ) + 1
   tile_group_width[ i ] = (tile_group_bottom_right [ i ] - tile_group_top_left [ i ] ) - ( (
   tile_group_height[ i ] -
   1 ) * num tile columns ) + 1
   b = true
   for(j = 0,j <i,j++)
       if (tile_group_bottom_right [ i ] - tile_group_width[ i ] == tile_group_bottom_right[ j ]
) {
       b = false }
   if ( (tile_group_bottom_right [ i ] + num_tile_columns - tile_group_width[ i ] + 1 <
   (num_tiles_minus1+1))
   &&b) {
       index++
       A[ index ] = tile_group_bottom_right [ i ] + num_tile_columns - tile_group_width[ i ]
+ 1
       B[ index ] = tile_group_bottom_right[ i ] + bottom_right_tile_offset[ i ]
   }
   if (tile_group_top_left[ i ] + tile_group_width[ i ] is not divisible by num tile columns) {
   index++
       A[ index ] = tile_group_top_left[ i ] + tile_group_width[ i ]
       B[ index ] = ceil( (tile_group_bottom_right [ i ] + 1 ) ÷ num tile columns ) *
       num_tile_columns - 1
   }
}
```

In a variant of this embodiment, the bottom-right corner of the last rectangular group is not determined in the for(){ } loop, but the bottom-right corner of the last rectangular partition is specified by the end of the picture.

In one version of this embodiment, the depth of the stack is restricted to a certain integer value.

In one alternative of this embodiment, the functionalities of a stack are implemented using an array data structure. This may be implemented using an array with the maximum size equal to the number of rectangular partitions and e.g. a pointer to point at the position of the active array element to be used for pointing at the next rectangular partition. The pointer value will be updated each time an element is added to the array or an element is read from the array.

Embodiment 6. A Recursive Process

In a sixth embodiment, the rectangular partitioning of the picture is derived using a recursive method. Alternatively, the derivation of the top-left position of the current partition is done using a recursive method.

In one example, the recursive method is defined as follows.

The recursive method R accepts two inputs: a rectangular area P and a position C in the rectangular area.
The values for positions C in each call to R are picked from a given list L.
In the recursive method R, if C is the bottom-right corner of the picture, the method R outputs P as a rectangular partition. If C is not the bottom-right corner of the picture the process continues as follows:
  the method R outputs the rectangle Q defined by top-left corner of P as the top-left corner of Q and C as the bottom-right corner of Q as a rectangular partition,
  method R makes a recursive call to R with new input parameters P' and C' which are defined as follows:
    P' is a rectangle in the not-yet partitioned area with the top-left corner T equal to the smallest address in the not-yet partitioned area and the bottom-right corner B defined as follows: If T is positioned on the left border of the picture, then B is the bottom-right corner of the picture. If T is not positioned on the left border of the picture, then B is the largest address positioned on the right border of the picture that the address T-1 and at least one address on the same row as B belong to the same rectangular partition.
    C' is specified in list L. The value of C' shall be within the rectangular area of P'.
  Once all recursive calls are executed, the picture is partitioned.

This embodiment can be combined with any of the Embodiments 2 to 4 depending on how a rectangular partition is signaled, e.g., the rectangular partition is signaled using the top-left and bottom-right corners, using the top-left and width and height, and using a distance to a fixed point.

In one version of this embodiment, the depth of the recursion is restricted to a certain integer value.

Embodiment 7. A Process Using for Loops

In a seventh embodiment, the derivation of the top-left position of the current partition is done using for-loops. As described in Embodiment 1, the decoder derives the locations and/or sizes of the partitions in tile raster scan order. Before this derivation, the decoder initializes a list that keeps track of what tiles in the picture that are yet to be associated with a partition. The size of the list is equal to the number of tiles in the picture, and the list is initialized such that all tiles in the picture are indicated as yet to be associated with a partition.

For the current partition, a for loop iterating over the tiles in raster scan order is used. The for loop iterates over the list and the for loop stops when a tile yet to be associated with a partition is found. This found first tile in raster scan order yet to be associated with a partition identifies the top left location of the current partition in that the found tile is the top left tile included in the current partition. Then the size or the bottom right tile of the current partition is determined as described elsewhere in this disclosure. After that, the tiles that belong (or are included) to the current partition are identified and the list is updated such that the tiles that belong to the current partition are indicated to be associated with a partition.

A decoder may perform all or a subset of the following steps for this embodiment to decode a picture:

1. Decode a tile partitioning structure from one or more syntax elements in the bitstream. The syntax is preferably located in a picture parameter set.

2. Determine the number of tile columns, the number of tile rows and the number of tiles N there are in the picture from syntax elements in the bitstream. The syntax is preferably located in a picture parameter set.

3. Decode the number of partitions there are in the picture where each partition consists of an integer number of tiles. The partitions may all be rectangular in shape such that the size of each partition can be described by a height and width in terms of number of tiles. For example, a partition may have a height of 3 tiles and a width of 4 tiles.

4. Initialize a list L of size N where each entry in list L correspond to a tile in the picture and the entries are arranged in raster scan order such that the $n^{th}$ entry in L correspond to the $n^{th}$ tile in the picture in raster scan order. Each of the N entries in list L is set to a value representing that the corresponding tile does not belong to a partition.

5. Derive the size and/or location for a current partition by the following sub steps:
   a. decode one or more location syntax elements for the current partition from the bitstream
   b. derive the size and/or the location of the current partition from the value(s) of the location syntax element(s) together with the size(s) and/or location(s) of previously derived partitions by the following ordered steps:
      i. The top-left position of the current partition is derived as the location of the first tile in raster scan order that is not included in any previously derived partitions. This is done by executing a for loop over the elements in list L until an entry with a value representing that the corresponding tile does not belong to a partition is found.
      ii. The size and/or the bottom right tile location of the current partition is determined as described elsewhere in this disclosure
      iii. The tiles that belong to (or are included in) the current partition are identified using the derived top-left position and the size and/or the bottom right tile location as described elsewhere in this disclosure. Then the list L is updated such that entries in list L that correspond to the tiles that belong to the current partition are set to a value representing that the corresponding tile does belong to a partition 6. Use the derived sizes and/or locations to decode the picture This embodiment can be combined with any of Embodiments 2 to 4 depending on how a rectangular partition is defined, e.g., the rectangular tile partition is signaled using the top-left and bottom-right corners, using the top-left and width and height, and using a distance to a fixed point.

Combining Embodiment 7 With Embodiment 2

In some embodiments, Embodiment 7 is combined with Embodiment 2. The exemplary syntax and semantics on top of JVET-M0853 is as follows.

The following table provides exemplary syntax for Embodiment 7 combined with Embodiment 2 on top of JVET-M0853. Modifications over JVET-M0853 are marked.

| | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ) | |
|       rect_tile_group_flag | u(1) |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         ~~if( i > 0 )~~ | |
|         ~~top_left_tile_idx[ i ]~~ | ~~u(v)~~ |
|         bottom_right_tile_idx[ i ] | u(v) |
|       ~~}~~ | |
|     } | |
|     loop_filter_across_tiles_enabled_flag | u(1) |
|   } | |
|   if( rect_tile_group_flag ) { | |
|     signalled_tile_group_id_flag | u(1) |
|     if( signalled_tile_group_id_flag ) { | |
|       signalled_tile_group_id_length_minus1 | ue(v) |

|  | Descriptor |
|---|---|
|       for( i = 0; i <= num_tile_groups_in_pic_minus1; i++ ) | |
|         tile_group_id[ i ] | u(v) |
|    } | |
|    rbsp_trailing_bits( ) | |
| } | |

Semantics for new/modified elements are shown below.

bottom_right_tile_idx[i] specifies the tile index of the tile located at the bottom-right corner of the i-th tile group. When not present, the variables top left tile idx[i] and bottom_right_tile_idx[i] are both set to i. The length of the bottom_right_tile_idx[i] syntax element is Ceil(Log2(NumTilesInPic)) bits.

It is a requirement of bitstream conformance that any particular tile shall only be included in one tile group.

The variable NumTilesInTileGroup[i], which specifies the number of tiles in the tile group, and related variables, are derived as follows:

is done using one width and one height code word per partition and the process is based on a for loop to find the top-left location of the current partition.

Modifications over JVET-M0853 are marked where added syntax is underlined and removed portions are crossed through.

```
if(i == 0)
   for (j = 0; j <= num_tiles_minus1; j++ )
      TileInTileGroupFlag[ j ] = 0
for( j = 0; j <= num_tiles_minus1; j++ )
   if( TileInTileGroupFlag[ j ] == 0 )
      break
top_left_tile_idx[ i ] = j
deltaTileIdx = bottom_right_tile_idx[ i ] - top_left_tile_idx[ i ]
NumTileRowsInTileGroup[ i ] = ( deltaTileIdx / ( num tile columns minus1 + 1))+1
NumTileColumnsInTileGroup[ i ] = ( deltaTileIdx % ( num tile columns minus1 + 1 ) ) + 1
NumTilesInTileGroup[ i ] = NumTileRowsInTileGroup[ i ] * NumTileColumnsInTileGroup[ i ]
for (y = 0; y < NumTileRowsInTileGroup[ i ]; y++)
   for (x = 0; x < NumTileColumnsInTileGroup[ i ]; x++)
      TileInTileGroupFlag[ top_left_tile_idx[ i ] + y * ( num_tile_columns_minus1 + 1) + x ] = 1
```

Combining Embodiment 7 With Embodiment 3

The following syntax and semantics show how Embodiment 7 may be combined with Embodiment 3. The signaling

|  | Descriptor |
|---|---|
| pic_parameter_set_rbsp( ) { | |
|   pps_pic_parameter_set_id | ue(v) |
|   pps_seq_parameter_set_id | ue(v) |
|   transform_skip_enabled_flag | u(1) |
|   single_tile_in_pic_flag | u(1) |
|   if( !single_tile_in_pic_flag ) { | |
|     num_tile_columns_minus1 | ue(v) |
|     num_tile_rows_minus1 | ue(v) |
|     uniform_tile_spacing_flag | u(1) |
|     if( !uniform_tile_spacing_flag ) { | |
|       for( i = 0; i < num_tile_columns_minus1; i++ ) | |
|         tile_column_width_minus1[ i ] | ue(v) |
|       for( i = 0; i < num_tile_rows_minus1; i++ ) | |
|         tile_row_height_minus1[ i ] | ue(v) |
|     } | |
|     single_tile_per_tile_group_flag | u(1) |
|     if(!single_tile_per_tile_group_flag ) | |
|       rect_tile_group_flag | u(1) |
|     if( rect_tile_group_flag && !single_tile_per_tile_group_flag ) { | |
|       num_tile_groups_in_pic_minus1 | ue(v) |
|       for( i = 0; i <= num_tile_groups_in_pic_minus1; i++ ) { | |
|         <u>*tile_group_height_minus1[ i ]*</u> | <u>*u(v)*</u> |
|         <u>*tile_group_width_minus1[ i ]*</u> | <u>*u(v)*</u> |
|         ~~if( i > 0)~~ | |

|  | Descriptor |
|---|---|
| ~~top_left_tile_idx[ i ]~~ | ~~u(v)~~ |
| ~~bottom_right_tile_idx[ i ]~~ | ~~u(v)~~ |
|     } | |
|   } | |
|   loop_filter_across_tiles_enabled_flag | u(1) |
| } | |
| if( rect_tile_group_flag ) { | |
|   signalled_tile_group_id_flag | u(1) |
|   if( signalled_tile_group_id_flag ) { | |
|     signalled_tile_group_id_length_minus1 | ue(v) |
|     for( i = 0; i <= num_tile_groups_in_pic_minus1; i++ ) | |
|       tile_group_id[ i ] | u(v) |
|   } | |
|   rbsp_trailing_bits( ) | |
| } | |

Semantics for new/modified elements are shown below.

tile_group_height_minus1[i] plus 1 specifies the height of the tile group in number of tiles. The length of the tile_group_height_minus1[i] syntax element is Ceil(Log2(num_tile_rows_minus1+1)) bits. When not present or num_tile_rows_minus1 is equal to 0, tile_group_height_minus1[i] is inferred to be equal to 0.

tile_group_width_minus1[i] plus 1 specifies the width of the tile group in number of tiles. The length of the tile_group_width_minus1[i] syntax element is Ceil(Log2(num_tile_columns_minus1+1)) bits. When not present or num_tile_columns_minus1 is equal to 0, tile_group_width_minus1[i] is inferred to be equal to 0.

It is a requirement of bitstream conformance that any particular tile shall only be included in one tile group.

The variable NumTilesInTileGroup[i], which specifies the number of tiles in the tile group, and related variables, are derived as follows:

In one variant of this embodiment, the restriction defines the allowed range for the position of the bottom-right corner of the next rectangular partition in the picture in the scan order.

In another variant of this embodiment, the restriction defines the allowed range for the width and height of the next rectangular partition in the picture in the scan order.

In another variant of this embodiment, the restriction defines the allowed range of addresses for the bottom right corner of the next rectangular partition in the picture in the scan order.

Following is an exemplary proposed restriction added to the specification text on top of M0853:

```
if(i == 0)
    for (j = 0; j <= num_tiles_minus1; j++ )
        TileInTileGroupFlag[ j ] = 0
for( j = 0; j <= num_tiles_minus1; j++ )
    if( TileInTileGroupFlag[ j ] == 0 )
        break
top_left_tile_idx[ i ] = j
NumTilesInTileGroup[ i ] = (tile_group_height_minus1[ i ]+1 ) * (tile_group_width_minus1[ i ]+1 )
for (y = 0; y < (tile_group_height_minus1[ i ] +1); y++)
    for (x = 0; x < ( tile_group_width_minus1[ i ] + 1 ); x++)
        TileInTileGroupFlag[ top_left_tile_idx[ i ] + y * ( num_tile_columns_minus1 + 1) + x]=
            1
```

Embodiment 8. Restriction

This embodiment describes restrictions in the semantics on top of M0853 to guaranty the third rectangular partition requirement stated in JVET-M_Notes_dA.

Figure 12:
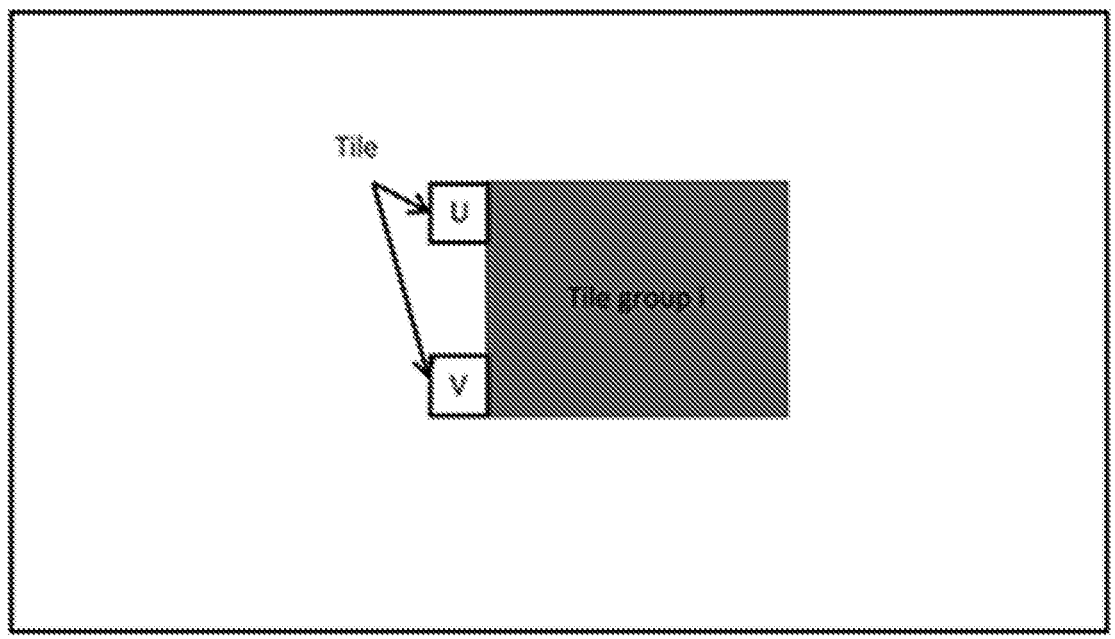
FIG. 12 shows a picture with tile groups according to some embodiments.

If rect_tile_group_flag is equal to 1, for every tile group i > 0 that does not start in the first tile
column, the tile with the tile index of the top-left corner of tile group i minus 1 (tile U in FIG.
12) and the tile with the tile index of the bottom-left corner of tile group i minus 1 (tile V in FIG.
12) shall belong to the same rectangular tile group j, j < i.

In some embodiments, a decoder may perform a check of the restriction specified above and if the restriction is not fulfilled the decoder may determine that the bitstream is erroneous and in responsive to detecting that an error has occurred, performing error concealment, and/or reporting the error over a communication network to a source of the encoded bit stream or as a notification to a user.

Embodiment 9. Distance Relative to a Fixed Point

In a ninth embodiment, a spatial partition structure as in Embodiment 1 is signaled by one or more syntax elements specifying the distance of the bottom-right corner of rectangular partition relative to a fixed point in the picture.

Embodiment 10. Other Order

Figures 13A, 13B:
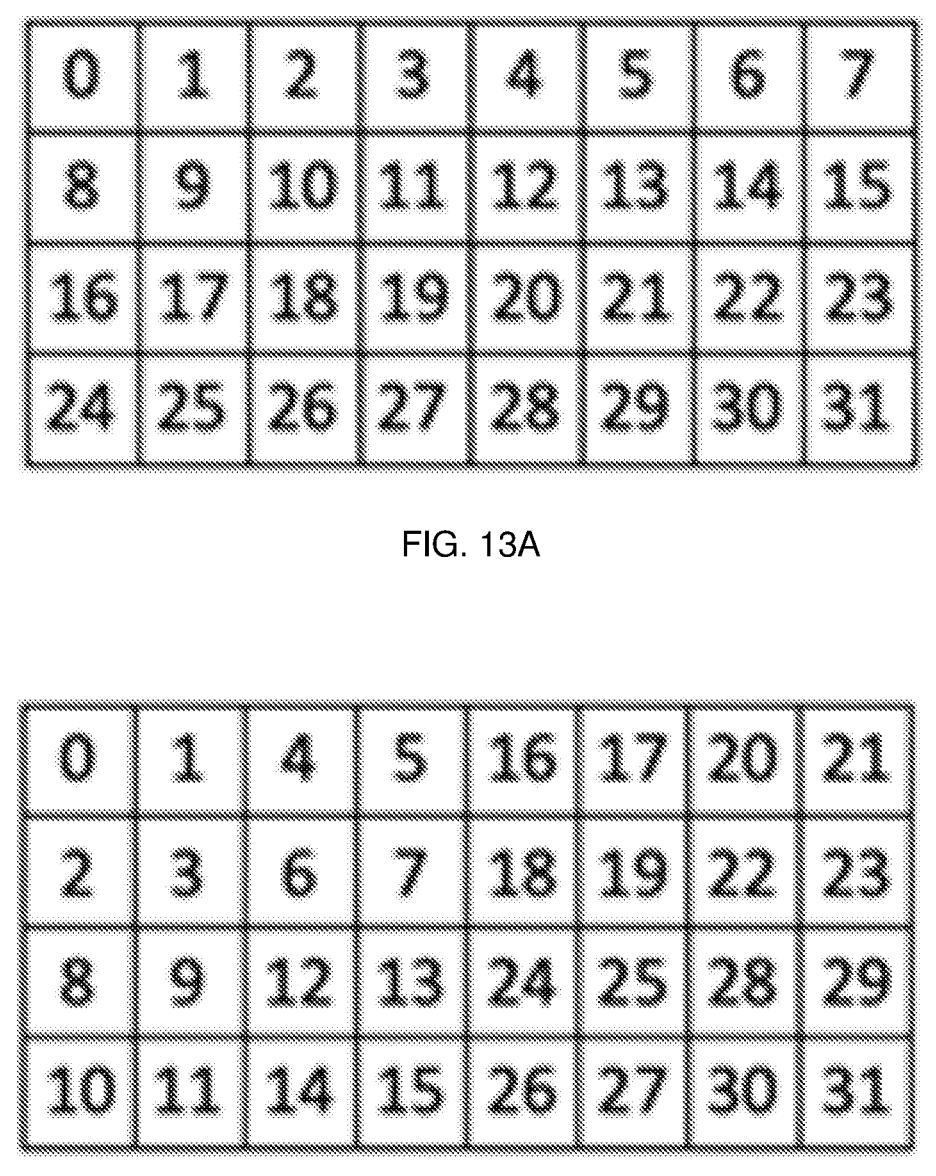

In a tenth embodiment, the method from any of the previous embodiments is used, but another pre-defined or signaled order is used instead of a raster scan order. As an example, the pre-defined order can be the Z-order. FIG. 13A shows a raster scan order and FIG. 13B shows a Z-order.

As an example, in this variant, Embodiment 1 becomes: the top-left position of the current partition is derived as the location of the first tile in a predefined order that is not included in any previously derived partitions.

In one embodiment, Z-order is used as the predefined order: the top-left position of the current partition is derived as the location of the first tile in Z-order that is not included in any previously derived partitions.

Embodiment 11.

Any combination of the embodiments provided above, e.g., Embodiments 1-10.

Figure 14A:
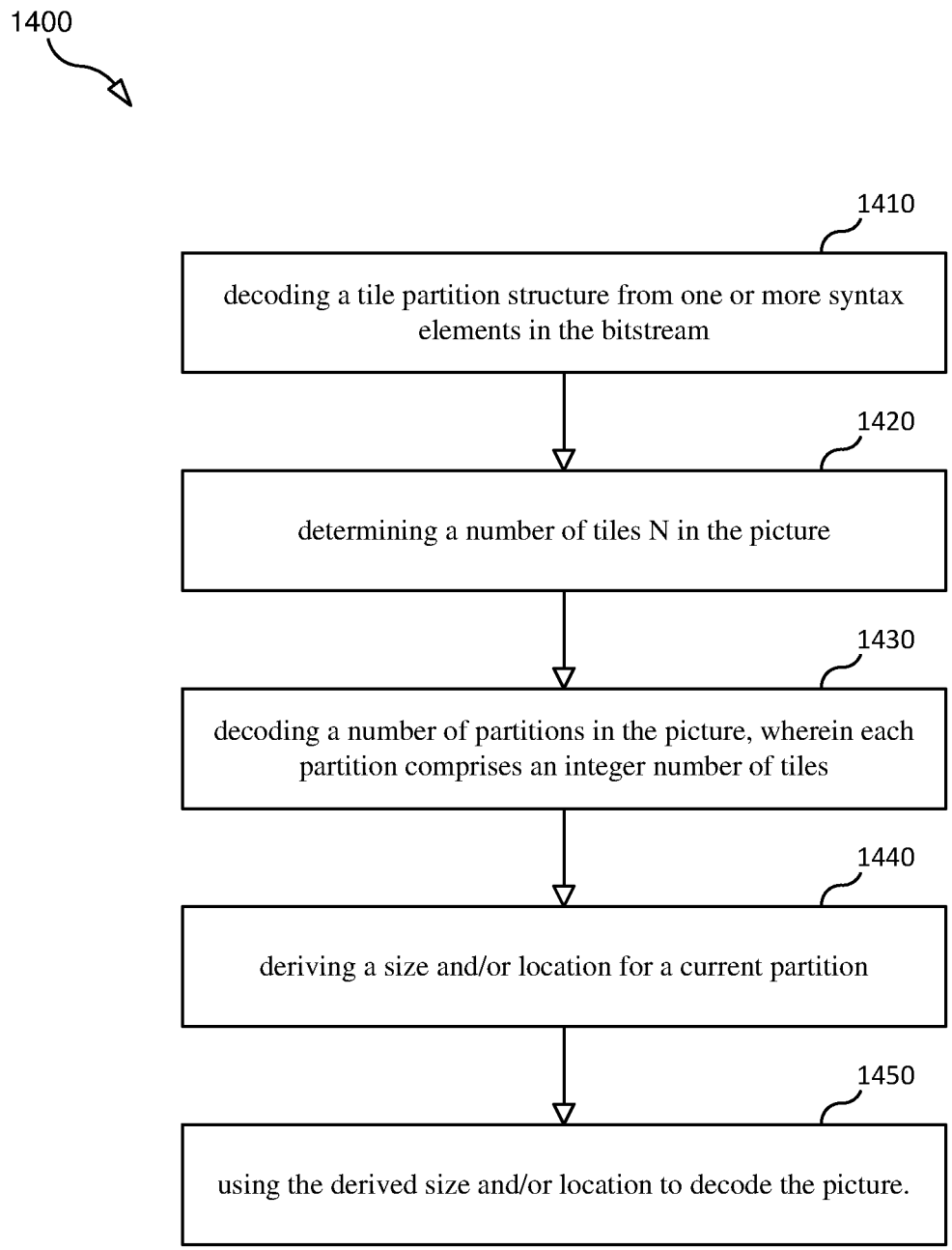
FIG. 14A is a flow chart illustrating a process according to an embodiment.
Figure 14B:
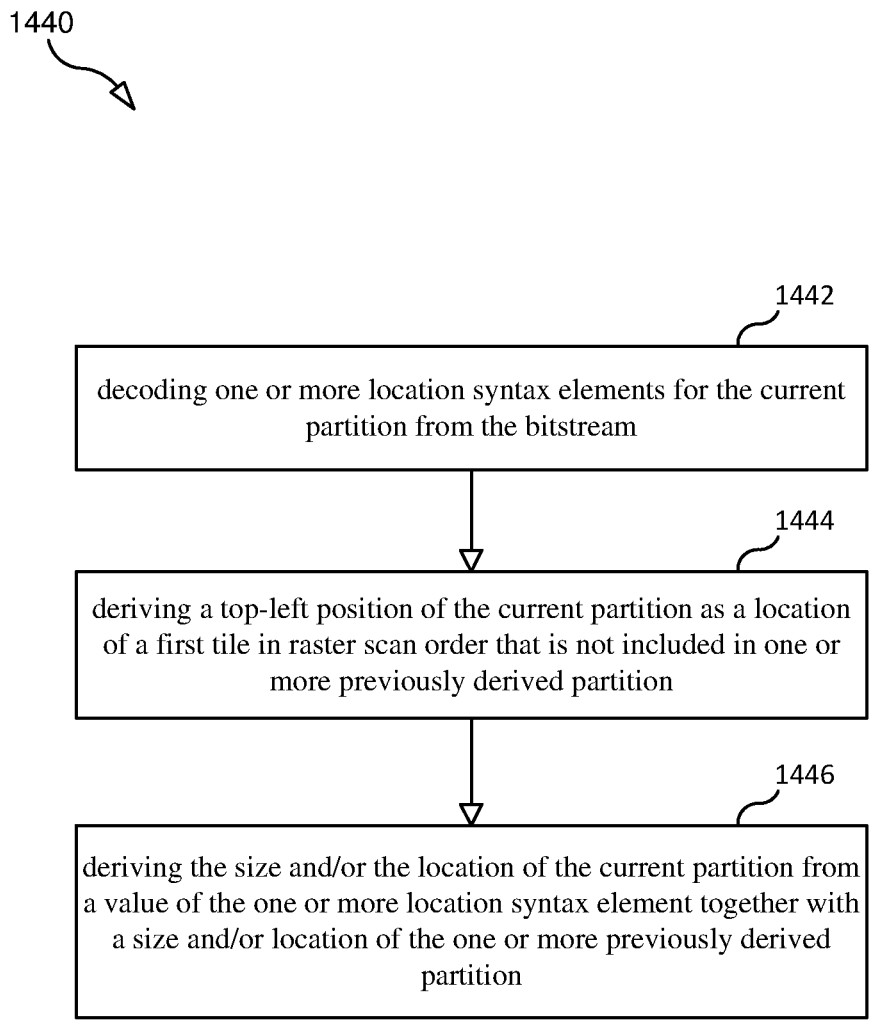
FIG. 14B is a flow chart illustrating a process according to an embodiment.

FIG. 14A is a flow chart illustrating a process 1400 according to an embodiment. Process 1400 is a method for decoding a picture from a bitstream. The method includes decoding a tile partition structure from one or more syntax elements in the bitstream (1410); determining a number of tiles N in the picture (1420); decoding a number of partitions in the picture, wherein each partition comprises an integer number of tiles (1430); deriving a size and/or location for a current partition (1440); and method includes using the derived size and/or location to decode the picture (1450). As shown in FIG. 14B, deriving the size and/or location for the current partition (1440) comprises: decoding one or more location syntax elements for the current partition from the bitstream (1442), deriving a top-left position of the current partition as a location of a first tile in raster scan order that is not included in one or more previously derived partition (1444), and deriving the size and/or the location of the current partition from a value of the one or more location syntax element together with a size and/or location of the one or more previously derived partition (1446).

In some embodiments, a rectangular partition comprises a tile group.

In some embodiments, the tile partition structure comprises at least three rectangular partitions, wherein at least one boundary of at least one rectangular partition has parts in common with at least two other rectangular partitions.

In some embodiments, one or more previously derived partitions have been derived in raster scan order.

In some embodiments, the partition structure has, when decoded, each of its entire left boundary and entire top boundary at a picture boundary or a neighboring one or more previously decoded partitions.

In some embodiments, the one or more location syntax elements comprises a syntax element representing a tile index, wherein the tile index is a number in the range of 0 to N-1, inclusive, and wherein N indicates the number of tiles in the picture and the tile index indicates a location of a bottom-right tile of the current partition.

In some embodiments, the one or more location syntax elements comprises one syntax element representing a y-coordinate of a location of a bottom-right tile of the current partition and one syntax element representing an x-coordinate of the location of the bottom-right tile of the current partition, and a bottom right location of the current partition is derived from the coordinate values.

In some embodiments, the one or more location syntax elements comprises one syntax element representing a width of the current partition in number of tiles and one syntax element representing a height of the current partition in number of tiles, and a bottom right location of the current partition is derived by adding the values of the width and height syntax elements to a derived top left location of the current partition.

In some embodiments, syntax elements are not decoded if the current partition is the last rectangular partition in raster scan order.

In some embodiments, the one or more location syntax elements comprises one or more syntax elements specifying the distance between the bottom-right corner of the current partition and a point B where point B is determined by previously signaled rectangular partitions.

In some embodiments, a stack data structure is used for determining the position of rectangular partitions in the picture.

In some embodiments, an array data structure is used for determining the position of the rectangular partitions in the picture.

In some embodiments, a recursive method is used for partitioning the picture into rectangular partitions.

In some embodiments, the method includes initializing a list L of size N, wherein list L comprises N entries, wherein each entry in list L corresponds to a tile in the picture and the one or more entries are arranged in raster scan order such that the n-th entry in L corresponds to the n-th tile in the picture in raster scan order, and wherein each of the N entries in list L is initialized to a value representing that the corresponding tile does not belong to a partition; deriving a top-left position of the current partition, wherein deriving the top-left position of the current partition comprises executing a for loop over the elements in list L until an entry with a value representing that the corresponding tile does not belong to a partition is found; identifying tiles included in the current partition using the derived top-left position and the bottom right location; and updating the list L such that entries in list L that correspond to the tiles that belong to the current partition are set to a value representing that the corresponding tile does belong to a partition.

In some embodiments, position of a bottom-right corner of rectangular partition i in the picture is restricted to a rectangular area defined by other rectangular partitions j in the scan order where j<i.

In some embodiments, width and height of rectangular partition i in the picture is restricted to a rectangular area defined by other rectangular partitions j in the scan order where j<i.

In some embodiments, the address or the location of the bottom-right corner of rectangular partition i in the picture is restricted to a subset of the addresses defined by other rectangular partitions j in the scan order where j<i.

In some embodiments, the spatial partition structure is signaled by one or more syntax elements specifying the distance of the bottom-right corner to a point B for each rectangular partition, wherein the point B is fixed.

In some embodiments, deriving a size and/or location for a current partition comprises deriving which tiles in the picture belong to the current partition.

Figure 15A:
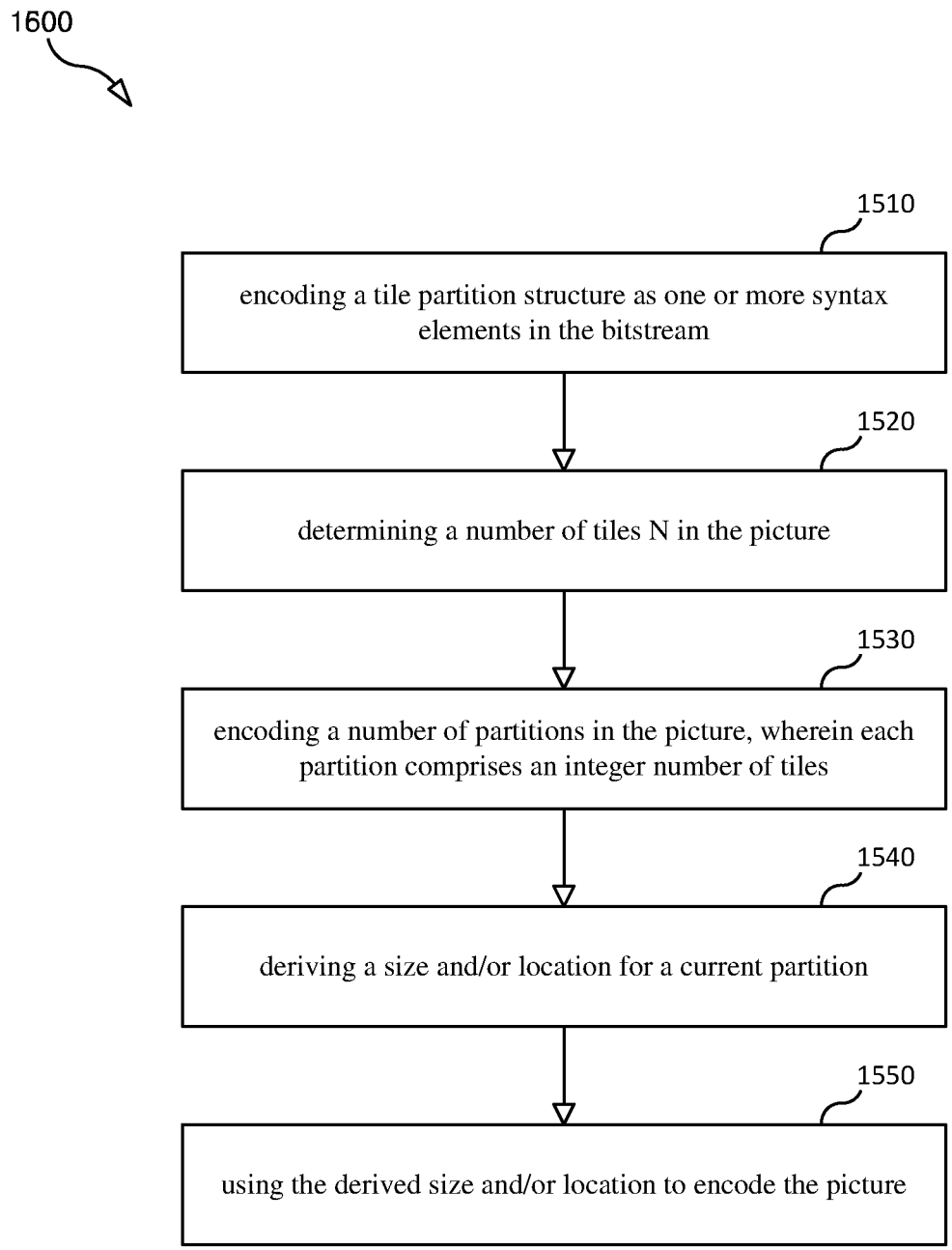
FIG. 15A is a flow chart illustrating a process according to an embodiment.
Figure 15B:
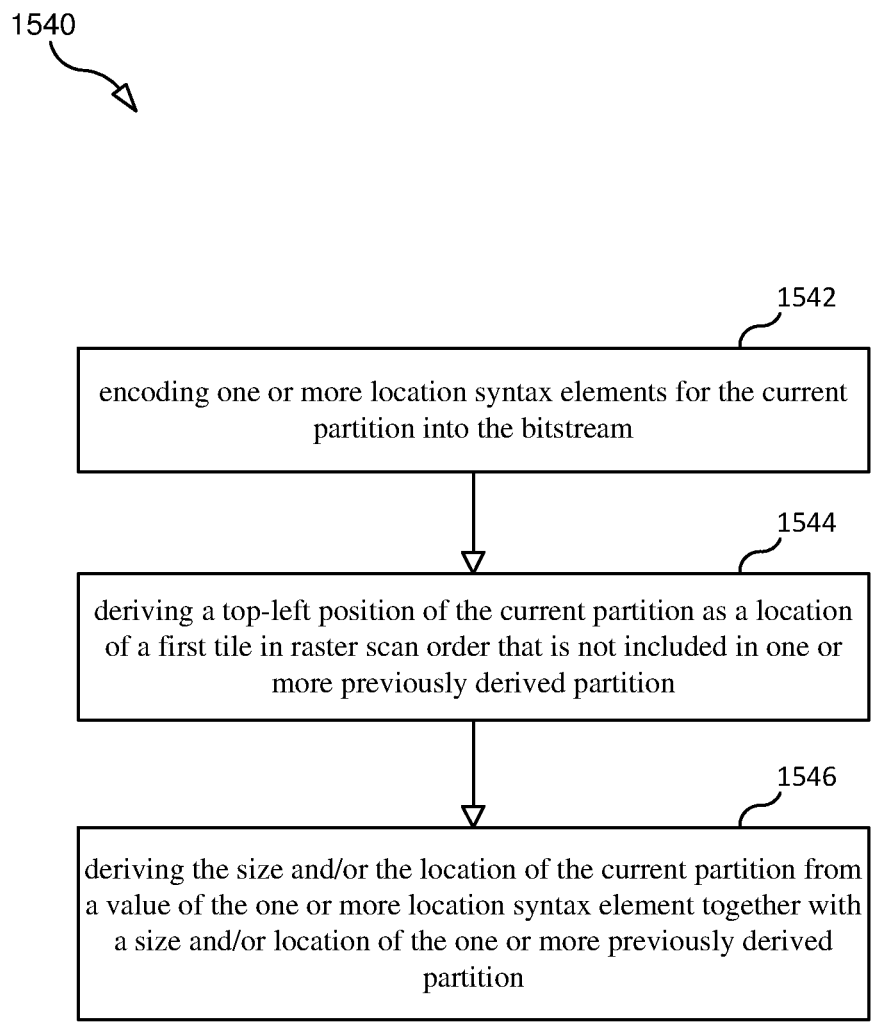
FIG. 15B is a flow chart illustrating a process according to an embodiment.

FIG. 15A is a flow chart illustrating a process 1500 according to an embodiment. Process 1500 is a method for encoding a picture into a bitstream. The method includes encoding a tile partition structure as one or more syntax elements in the bitstream (1510); determining a number of tiles N in the picture (1520); encoding a number of partitions in the picture, wherein each partition comprises an integer number of tiles (1530); deriving a size and/or location for a current partition (1540); and using the derived size and/or location to encode the picture (1550). As shown in FIG. 15B, deriving the size and/or location for the current partition (1540) comprises: encoding one or more location syntax elements for the current partition into the bitstream (1542), deriving a top-left position of the current partition as a location of a first tile in raster scan order that is not included in one or more previously derived partition (1544), and deriving the size and/or the location of the current partition from a value of the one or more location syntax element together with a size and/or location of the one or more previously derived partition (1546).

In some embodiments, a rectangular partition comprises a tile group.

In some embodiments, the tile partition structure comprises at least three rectangular partitions, wherein at least one boundary of at least one rectangular partition has parts in common with at least two other rectangular partitions.

In some embodiments, the one or more previously derived partitions have been derived in raster scan order.

In some embodiments, the one or more location syntax elements comprises a syntax element representing a tile index, wherein the tile index is a number in the range of 0 to N-1, inclusive, and wherein N indicates the number of tiles in the picture and the tile index indicates a location of a bottom-right tile of the current partition.

In some embodiments, the one or more location syntax elements comprises one syntax element representing a y-coordinate of a location of a bottom-right tile of the current partition and one syntax element representing an x-coordinate of the location of the bottom-right tile of the current partition, and a bottom right location of the current partition is derived from the coordinate values.

In some embodiments, the one or more location syntax elements comprises one syntax element representing a width of the current partition in number of tiles and one syntax element representing a height of the current partition in number of tiles, and a bottom right location of the current partition is derived by adding the values of the width and height syntax elements to a derived top left location of the current partition.

In some embodiments, the one or more location syntax elements comprises one or more syntax elements specifying the distance between the bottom-right corner of the current partition and a point B where point B is determined by previously signaled rectangular partitions.

In some embodiments, a stack data structure is used for determining the position of rectangular partitions in the picture.

In some embodiments, an array data structure is used for determining the position of the rectangular partitions in the picture.

In some embodiments, a recursive method is used for partitioning the picture into rectangular partitions.

In some embodiments, the method further includes initializing a list L of size N, wherein list L comprises N entries, wherein each entry in list L corresponds to a tile in the picture and the one or more entries are arranged in raster scan order such that the n-th entry in L corresponds to the n-th tile in the picture in raster scan order, and wherein each of the N entries in list L is initialized to a value representing that the corresponding tile does not belong to a partition; deriving a top-left position of the current partition, wherein deriving the top-left position of the current partition comprises executing a for loop over the elements in list L until an entry with a value representing that the corresponding tile does not belong to a partition is found; identifying tiles included in the current partition using the derived top-left position and the bottom right location; and updating the list L such that entries in list L that correspond to the tiles that belong to the current partition are set to a value representing that the corresponding tile does belong to a partition.

In some embodiments, the position of a bottom-right corner of rectangular partition i in the picture is restricted to a rectangular area defined by other rectangular partitions j in the scan order where j<i.

In some embodiments, the width and height of rectangular partition i in the picture is restricted to a rectangular area defined by other rectangular partitions j in the scan order where j<i.

In some embodiments, the address or the location of the bottom-right corner of rectangular partition i in the picture is restricted to a subset of the addresses defined by other rectangular partitions j in the scan order where j<i.

In some embodiments, the spatial partition structure is signaled by one or more syntax elements specifying the distance of the bottom-right corner to a point B for each rectangular partition, wherein the point B is fixed.

In some embodiments, deriving a size and/or location for a current partition comprises deriving which tiles in the picture belong to the current partition.

Figure 16:
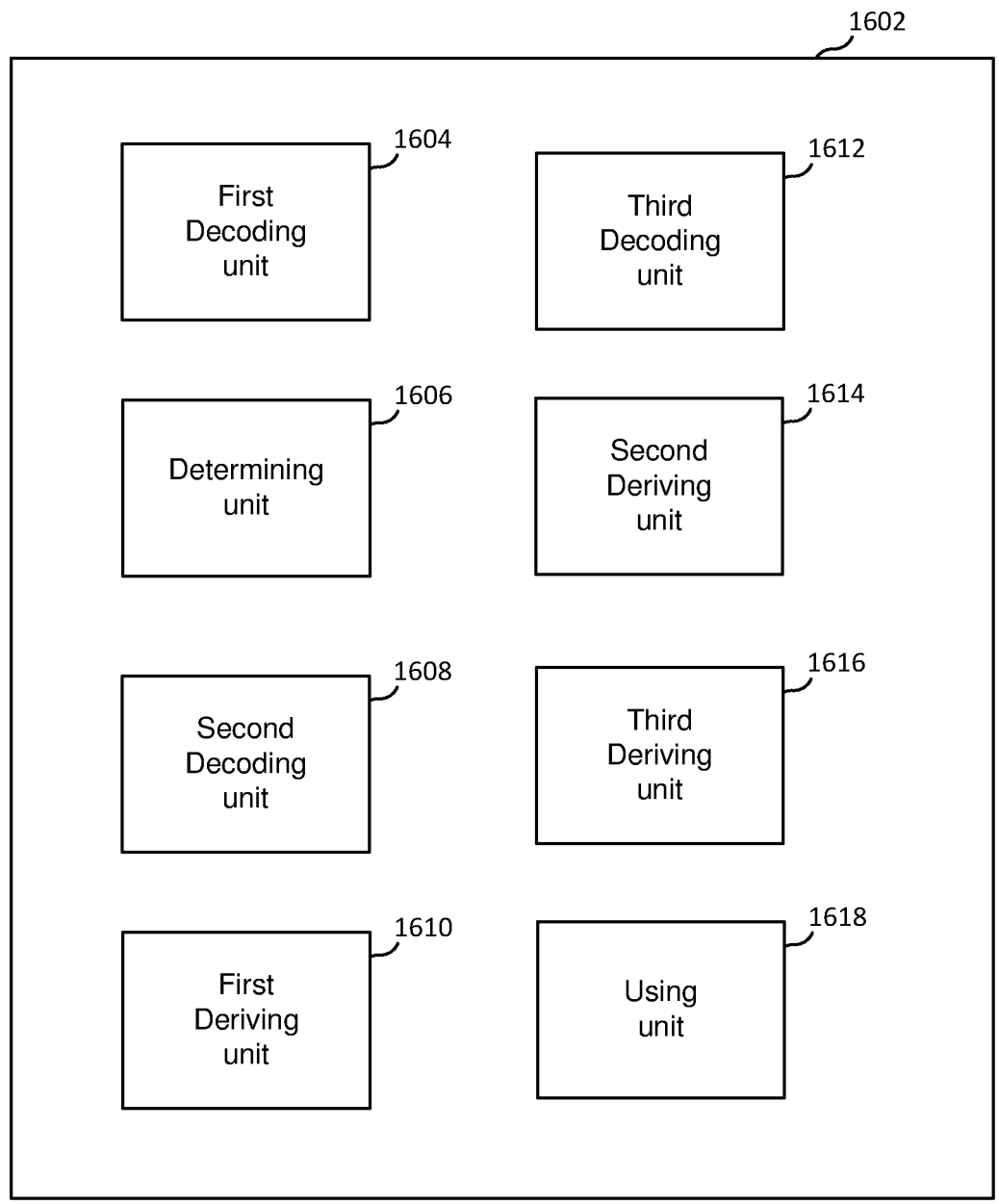
FIG. 16 is a diagram showing functional units of a decoder according to one embodiment.

FIG. 16 is a diagram showing functional units of a decoder 1602 according to some embodiments. As shown in FIG. 16, decoder 1602 includes a first decoding unit 1604 for decoding a tile partition structure from one or more syntax elements in the bitstream; a determining unit 1606 for determining a number of tiles N in the picture; a second decoding unit 1608 for decoding a number of partitions in the picture, wherein each partition comprises an integer number of tiles; a first deriving unit 1610 for deriving a size and/or location for a current partition; a third decoding unit 1612 for decoding one or more location syntax elements for the current partition from the bitstream; a second deriving unit 1614 for deriving a top-left position of the current partition as a location of a first tile in raster scan order that is not included in one or more previously derived partition; a third deriving unit 1616 for deriving the size and/or the location of the current partition from a value of the one or more location syntax element together with a size and/or location of the one or more previously derived partition; and a using unit 1618 for using the derived size and/or location to decode the picture.

Figure 17:
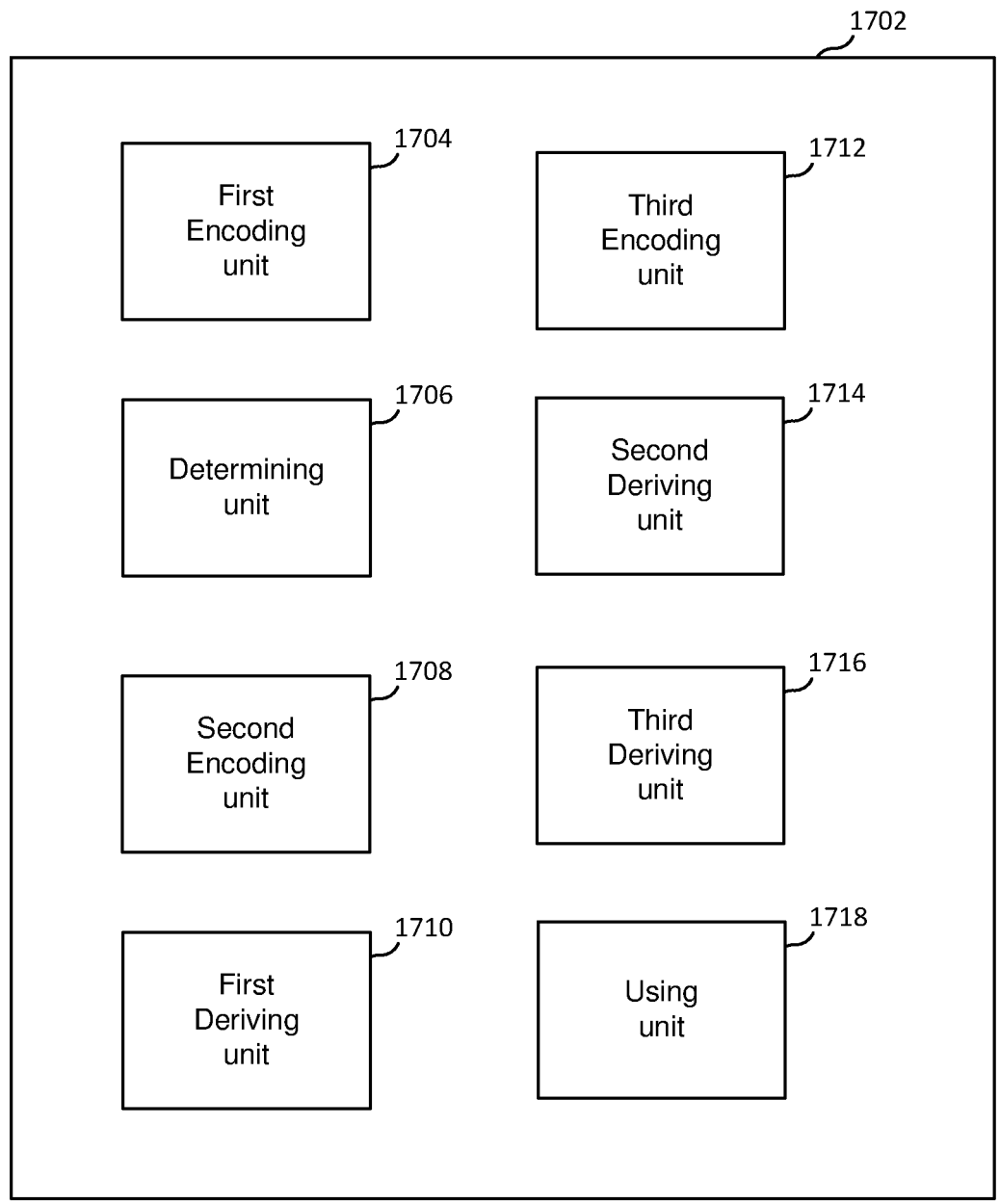
FIG. 17 is a diagram showing functional units of an encoder according to one embodiment.

FIG. 17 is a diagram showing functional units of an encoder 1702 according to some embodiments. As shown in FIG. 17, encoder 1702 includes a first encoding unit 1704 for encoding a tile partition structure as one or more syntax elements in the bitstream; a determining unit 1706 for determining a number of tiles N in the picture; a second encoding unit 1708 for encoding a number of partitions in the picture, wherein each partition comprises an integer number of tiles; a first deriving unit 1710 for deriving a size and/or location for a current partition; a third encoding unit 1712 for encoding one or more location syntax elements for the current partition into the bitstream; a second deriving unit 1714 for deriving a top-left position of the current partition as a location of a first tile in raster scan order that is not included in one or more previously derived partition; a third deriving unit 1716 for deriving the size and/or the location of the current partition from a value of the one or more location syntax element together with a size and/or location of the one or more previously derived partition; and a using unit 1718 for using the derived size and/or location to encode the picture.

Figure 18:
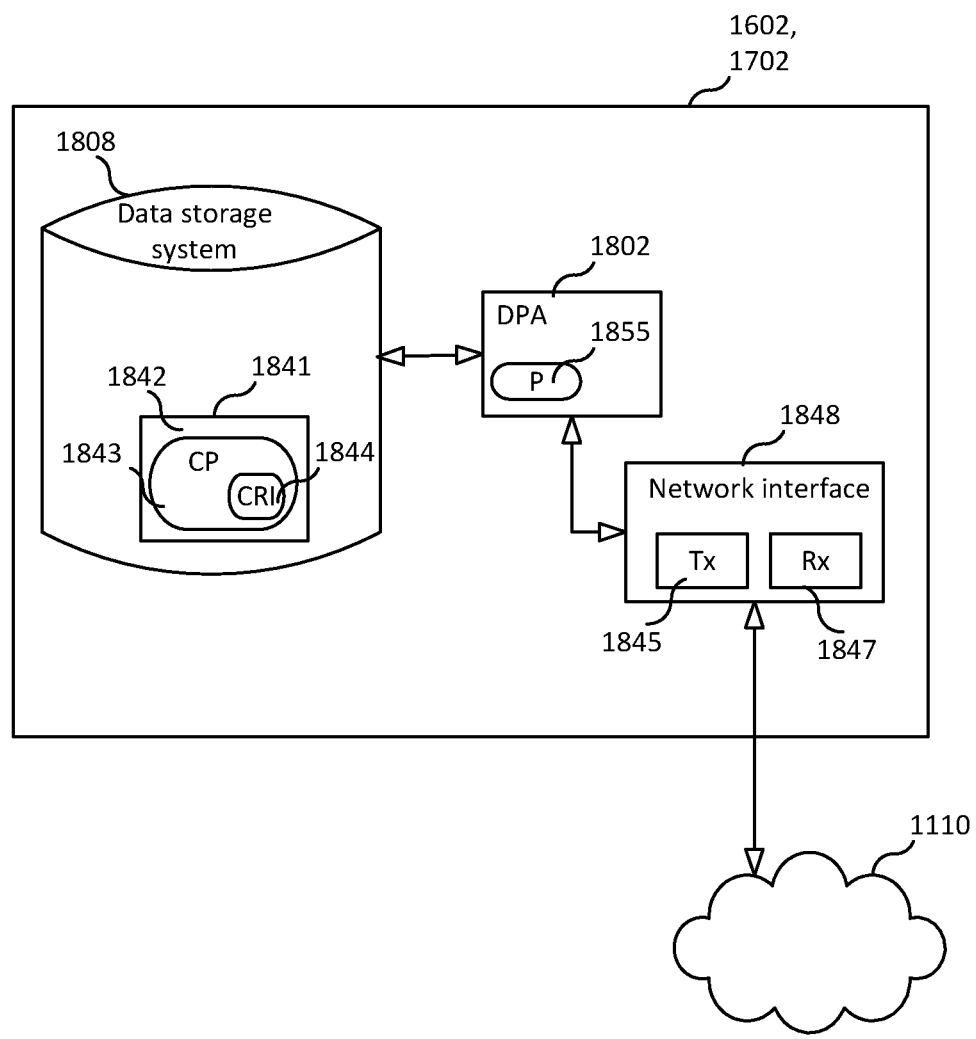
FIG. 18 is a block diagram of a node according to some embodiments.

FIG. 18 is a block diagram of a node (e.g., decoder 1602 and encoder 172). cording to some embodiments. As shown in FIG. 18, the node may comprise: processing circuitry (PC) 1802, which may include one or more processors (P) 1855 (e.g., a general purpose microprocessor and/or one or more other processors, such as an application specific integrated circuit (ASIC), field-programmable gate arrays (FPGAs), and the like); a network interface 1848 comprising a transmitter (Tx) 1845 and a receiver (Rx) 1847 for enabling the node to transmit data to and receive data from other nodes connected to a network 1110 (e.g., an Internet Protocol (IP) network) to which network interface 1848 is connected; and a local storage unit (a.k.a., "data storage system") 1808, which may include one or more non-volatile storage devices and/or one or more volatile storage devices. In embodiments where PC 1802 includes a programmable processor, a computer program product (CPP) 1841 may be provided. CPP 1841 includes a computer readable medium (CRM) 1842 storing a computer program (CP) 1843 comprising computer readable instructions (CRI) 1844. CRM 1842 may be a non-transitory computer readable medium, such as, magnetic media (e.g., a hard disk), optical media, memory devices (e.g., random access memory, flash memory), and the like. In some embodiments, the CRI 1844 of computer program 1843 is configured such that when executed by PC 1802, the CRI causes the node to perform steps described herein (e.g., steps described herein with reference to the flow charts). In other embodiments, the node may be configured to perform steps described herein without the need for code. That is, for example, PC 1802 may consist merely of one or more ASICs. Hence, the features of the embodiments described herein may be implemented in hardware and/or software.

Summary of Various Embodiments

A1. A method for decoding a picture from a bitstream, the method comprising: decoding a tile partition structure from one or more syntax elements in the bitstream; determining a number of tiles N in the picture; decoding a number of partitions in the picture, wherein each partition comprises an integer number of tiles; deriving a size and/or location for a current partition, wherein deriving the size and/or location for the current partition comprises: decoding one or more location syntax elements for the current partition from the bitstream, deriving a top-left position of the current partition as a location of a first tile in raster scan order that is not included in one or more previously derived partition, and deriving the size and/or the location of the current partition from a value of the one or more location syntax element together with a size and/or location of the one or more previously derived partition; and using the derived size and/or location to decode the picture.

A2. The method of embodiment A1, wherein a rectangular partition comprises a tile group.

A3. The method of embodiment A1 or A2, wherein the tile partition structure comprises at least three rectangular partitions, wherein at least one boundary of at least one rectangular partition has parts in common with at least two other rectangular partitions.

A4. The method of any of the previous embodiments, wherein the one or more previously derived partitions have been derived in raster scan order.

A5. The method of any of the previous embodiments, wherein the partition structure has, when decoded, each of its entire left boundary and entire top boundary at a picture boundary or a neighboring one or more previously decoded partitions.

A6. The method of any of the previous embodiments, wherein the one or more location syntax elements comprises a syntax element representing a tile index, wherein the tile index is a number in the range of 0 to N-1, inclusive, and wherein N indicates the number of tiles in the picture and the tile index indicates a location of a bottom-right tile of the current partition.

A7. The method of any one of embodiments A1 to A5, wherein the one or more location syntax elements comprises one syntax element representing a y-coordinate of a location of a bottom-right tile of the current partition and one syntax element representing an x-coordinate of the location of the bottom-right tile of the current partition, and a bottom right location of the current partition is derived from the coordinate values.

A8. The method of any one of embodiments A1 to A5, wherein the one or more location syntax elements comprises one syntax element representing a width of the current partition in number of tiles and one syntax element representing a height of the current partition in number of tiles, and a bottom right location of the current partition is derived by adding the values of the width and height syntax elements to a derived top left location of the current partition.

A9. The method of embodiment A8, wherein syntax elements are not decoded if the current partition is the last rectangular partition in raster scan order.

A10. The method of any one of embodiments A1 to A5, wherein the one or more location syntax elements comprises one or more syntax elements specifying the distance between the bottom-right corner of the current partition and a point B where point B is determined by previously signaled rectangular partitions.

A11. The method of any previous embodiments, wherein a stack data structure is used for determining the position of rectangular partitions in the picture.

A12. The method of any one of embodiments A1 to A10, wherein an array data structure is used for determining the position of the rectangular partitions in the picture.

A13. The method of any one of embodiments A1 to A10, wherein a recursive method is used for partitioning the picture into rectangular partitions.

A14. The method of any one of embodiments A5 to A10, further comprising:
initializing a list L of size N, wherein list L comprises N entries, wherein each entry in list L corresponds to a tile in the picture and the one or more entries are arranged in raster scan order such that the n-th entry in L corresponds to the n-th tile in the picture in raster scan order, and wherein each of the N entries in list L is initialized to a value representing that the corresponding tile does not belong to a partition; deriving a top-left position of the current partition, wherein deriving the top-left position of the current partition comprises executing a for loop over the elements in list L until an entry with a value representing that the corresponding tile does not belong to a partition is found; identifying tiles included in the current partition using the derived top-left position and the bottom right location; and updating the list L such that entries in list L that correspond to the tiles that belong to the current partition are set to a value representing that the corresponding tile does belong to a partition.

A15. The method of any previous embodiments, wherein the position of a bottom-right corner of rectangular partition i in the picture is restricted to a rectangular area defined by other rectangular partitions j in the scan order where j<i.

A16. The method of any previous embodiments, wherein the width and height of rectangular partition i in the picture is restricted to a rectangular area defined by other rectangular partitions j in the scan order where j<i.

A17. The method of any previous embodiments, wherein the address or the location of the bottom-right corner of rectangular partition i in the picture is restricted to a subset of the addresses defined by other rectangular partitions j in the scan order where j<i.

A18. The method of any one of embodiments A1 to A8, wherein the spatial partition structure is signaled by one or more syntax elements specifying the distance of the bottom-right corner to a point B for each rectangular partition, wherein the point B is fixed.

A19. The method of any one of embodiments A1 to A18, wherein deriving a size and/or location for a current partition comprises deriving which tiles in the picture belong to the current partition.

A20. A computer program comprising instructions which, when executed by processing circuity, causes the processing circuitry to carry out the method of any one of embodiments A1-A19.

A21. A carrier containing the computer program of embodiment A20, wherein the carrier is one of an electronic signal, an optical signal, a radio signal, and a computer readable storage medium.

B 1. A method for encoding a picture into a bitstream, the method comprising:
encoding a tile partition structure as one or more syntax elements in the bitstream; determining a number of tiles N in the picture; encoding a number of partitions in the picture, wherein each partition comprises an integer number of tiles; deriving a size and/or location for a current partition, wherein deriving the size and/or location for the current partition comprises: encoding one or more location syntax elements for the current partition into the bitstream, deriving a top-left position of the current partition as a location of a first tile in raster scan order that is not included in one or more previously derived partition, and deriving the size and/or the location of the current partition from a value of the one or more location syntax element together with a size and/or location of the one or more previously derived partition; and using the derived size and/or location to encode the picture.

B2. The method of embodiment B1, wherein a rectangular partition comprises a tile group.

B3. The method of embodiment B1 or B2, wherein the tile partition structure comprises at least three rectangular partitions, wherein at least one boundary of at least one rectangular partition has parts in common with at least two other rectangular partitions.

B4. The method of any of the previous embodiments, wherein the one or more previously derived partitions have been derived in raster scan order.

B5. The method of any of the previous embodiments, wherein the one or more location syntax elements comprises a syntax element representing a tile index, wherein the tile index is a number in the range of 0 to N-1, inclusive, and wherein N indicates the number of tiles in the picture and the tile index indicates a location of a bottom-right tile of the current partition.

B6. The method of any one of embodiments B1 to B4, wherein the one or more location syntax elements comprises one syntax element representing a y-coordinate of a location of a bottom-right tile of the current partition and one syntax element representing an x-coordinate of the location of the bottom-right tile of the current partition, and a bottom right location of the current partition is derived from the coordinate values.

B7. The method of any one of embodiments B1 to B5, wherein the one or more location syntax elements comprises one syntax element representing a width of the current partition in number of tiles and one syntax element representing a height of the current partition in number of tiles, and a bottom right location of the current partition is derived by adding the values of the width and height syntax elements to a derived top left location of the current partition.

B8. The method of any one of embodiments B1 to B4, wherein the one or more location syntax elements comprises one or more syntax elements specifying the distance between the bottom-right corner of the current partition and a point B where point B is determined by previously signaled rectangular partitions.

B9. The method of any previous embodiments, wherein a stack data structure is used for determining the position of rectangular partitions in the picture.

B10. The method of any one of embodiments B1 to B8, wherein an array data structure is used for determining the position of the rectangular partitions in the picture.

B11. The method of any one of embodiments B1 to B8, wherein a recursive method is used for partitioning the picture into rectangular partitions.

B12. The method of any one of embodiments B5 to B8, further comprising: initializing a list L of size N, wherein list L comprises N entries, wherein each entry in list L corresponds to a tile in the picture and the one or more entries are arranged in raster scan order such that the n-th entry in L corresponds to the n-th tile in the picture in raster scan order, and wherein each of the N entries in list L is initialized to a value representing that the corresponding tile does not belong to a partition; deriving a top-left position of the current partition, wherein deriving the top-left position of the current partition comprises executing a for loop over the elements in list L until an entry with a value representing that the corresponding tile does not belong to a partition is found; identifying tiles included in the current partition using the derived top-left position and the bottom right location; and updating the list L such that entries in list L that correspond to the tiles that belong to the current partition are set to a value representing that the corresponding tile does belong to a partition.

B13. The method of any previous embodiments, wherein the position of a bottom-right corner of rectangular partition i in the picture is restricted to a rectangular area defined by other rectangular partitions j in the scan order where j<i.

B14. The method of any previous embodiments, wherein the width and height of rectangular partition i in the picture is restricted to a rectangular area defined by other rectangular partitions j in the scan order where j<i.

B15. The method of any previous embodiments, wherein the address or the location of the bottom-right corner of rectangular partition i in the picture is restricted to a subset of the addresses defined by other rectangular partitions j in the scan order where j<i.

B16. The method of any one of embodiments B1 to B7, wherein the spatial partition structure is signaled by one or more syntax elements specifying the distance of the bottom-right corner to a point B for each rectangular partition, wherein the point B is fixed.

B17. The method of any one of embodiments B1 to B16, wherein deriving a size and/or location for a current partition comprises deriving which tiles in the picture belong to the current partition.

B18. A computer program comprising instructions which, when executed by processing circuitry, causes the processing circuitry to carry out the method of any one of embodiments B1-B17.

B19. A carrier containing the computer program of embodiment B18, wherein the carrier is one of an electronic signal, an optical signal, a radio signal, and a computer readable storage medium.

C1. A decoder for decoding a picture from a bitstream, the decoder adapted to: decode a tile partition structure from one or more syntax elements in the bitstream; determine a number of tiles N in the picture; decode a number of partitions in the picture, wherein each partition comprises an integer number of tiles; derive a size and/or location for a current partition, wherein deriving the size and/or location for the current partition comprises: decode one or more location syntax elements for the current partition from the bitstream, derive a top-left position of the current partition as a location of a first tile in raster scan order that is not included in one or more previously derived partition, and derive the size and/or the location of the current partition from a value of the one or more location syntax element together with a size and/or location of the one or more previously derived partition; and use the derived size and/or location to decode the picture.

C2. The decoder of embodiment C1, wherein a rectangular partition comprises a tile group.

C3. The decoder of embodiment C1 or C2, wherein the tile partition structure comprises at least three rectangular partitions, wherein at least one boundary of at least one rectangular partition has parts in common with at least two other rectangular partitions.

C4. The decoder of any of the previous embodiments, wherein the one or more previously derived partitions have been derived in raster scan order.

C5. The decoder of any of the previous embodiments, wherein the partition structure has, when decoded, each of its entire left boundary and entire top boundary at a picture boundary or a neighboring one or more previously decoded partitions.

C6. The decoder of any of the previous embodiments, wherein the one or more location syntax elements comprises a syntax element representing a tile index, wherein the tile index is a number in the range of 0 to N-1, inclusive, and wherein N indicates the number of tiles in the picture and the tile index indicates a location of a bottom-right tile of the current partition.

C7. The decoder of any one of embodiments C1 to C5, wherein the one or more location syntax elements comprises one syntax element representing a y-coordinate of a location of a bottom-right tile of the current partition and one syntax element representing an x-coordinate of the location of the bottom-right tile of the current partition, and a bottom right location of the current partition is derived from the coordinate values.

C8. The decoder of any one of embodiments C1 to C5, wherein the one or more location syntax elements comprises one syntax element representing a width of the current partition in number of tiles and one syntax element representing a height of the current partition in number of tiles, and a bottom right location of the current partition is derived by adding the values of the width and height syntax elements to a derived top left location of the current partition.

C9. The decoder of embodiment C8, wherein syntax elements are not decoded if the current partition is the last rectangular partition in raster scan order.

C10. The decoder of any one of embodiments C1 to C5, wherein the one or more location syntax elements comprises one or more syntax elements specifying the distance between the bottom-right corner of the current partition and a point B where point B is determined by previously signaled rectangular partitions.

C11. The decoder of any previous embodiments, wherein a stack data structure is used for determining the position of rectangular partitions in the picture.

C12. The decoder of any one of embodiments C1 to C10, wherein an array data structure is used for determining the position of the rectangular partitions in the picture.

C13. The decoder of any one of embodiments C1 to C10, wherein a recursive method is used for partitioning the picture into rectangular partitions.

C14. The decoder of any one of embodiments C5 to C10, the decoder further adapted to: initialize a list L of size N, wherein list L comprises N entries, wherein each entry in list L corresponds to a tile in the picture and the one or more entries are arranged in raster scan order such that the n-th entry in L corresponds to the n-th tile in the picture in raster scan order, and wherein each of the N entries in list L is initialized to a value representing that the corresponding tile does not belong to a partition; derive a top-left position of the current partition, wherein deriving the top-left position of the current partition comprises executing a for loop over the elements in list L until an entry with a value representing that the corresponding tile does not belong to a partition is found; identify tiles included in the current partition using the derived top-left position and the bottom right location; and update the list L such that entries in list L that correspond to the tiles that belong to the current partition are set to a value representing that the corresponding tile does belong to a partition.

C15. The decoder of any previous embodiments, wherein the position of a bottom-right corner of rectangular partition i in the picture is restricted to a rectangular area defined by other rectangular partitions j in the scan order where j<i.

C16. The decoder of any previous embodiments, wherein the width and height of rectangular partition i in the picture is restricted to a rectangular area defined by other rectangular partitions j in the scan order where j<i.

C17. The decoder of any previous embodiments, wherein the address or the location of the bottom-right corner of rectangular partition i in the picture is restricted to a subset of the addresses defined by other rectangular partitions j in the scan order where j<i.

C18. The decoder of any one of embodiments A1 to A8, wherein the spatial partition structure is signaled by one or more syntax elements specifying the distance of the bottom-right corner to a point B for each rectangular partition, wherein the point B is fixed.

C19. The decoder of any one of embodiments C1 to C18, wherein deriving a size and/or location for a current partition comprises deriving which tiles in the picture belong to the current partition.

D1. An encoder for encoding a picture into a bitstream, the encoder adapted to: encode a tile partition structure as one or more syntax elements in the bitstream; determine a number of tiles N in the picture; encode a number of partitions in the picture, wherein each partition comprises an integer number of tiles; derive a size and/or location for a current partition, wherein deriving the size and/or location for the current partition comprises: encode one or more location syntax elements for the current partition into the bitstream, derive a top-left position of the current partition as a location of a first tile in raster scan order that is not included in one or more previously derived partition, and derive the size and/or the location of the current partition from a value of the one or more location syntax element together with a size and/or location of the one or more previously derived partition; and use the derived size and/or location to encode the picture.

D2. The encoder of embodiment D1, wherein a rectangular partition comprises a tile group.

D3. The encoder of embodiment D1 or D2, wherein the tile partition structure comprises at least three rectangular partitions, wherein at least one boundary of at least one rectangular partition has parts in common with at least two other rectangular partitions.

D4. The encoder of any of the previous embodiments, wherein the one or more previously derived partitions have been derived in raster scan order.

D5. The encoder method of any of the previous embodiments, wherein the one or more location syntax elements comprises a syntax element representing a tile index, wherein the tile index is a number in the range of 0 to N-1, inclusive, and wherein N indicates the number of tiles in the picture and the tile index indicates a location of a bottom-right tile of the current partition.

D6. The encoder of any one of embodiments D1 to D4, wherein the one or more location syntax elements comprises one syntax element representing a y-coordinate of a location of a bottom-right tile of the current partition and one syntax element representing an x-coordinate of the location of the bottom-right tile of the current partition, and a bottom right location of the current partition is derived from the coordinate values.

D7. The encoder of any one of embodiments D1 to D5, wherein the one or more location syntax elements comprises one syntax element representing a width of the current partition in number of tiles and one syntax element representing a height of the current partition in number of tiles, and a bottom right location of the current partition is derived by adding the values of the width and height syntax elements to a derived top left location of the current partition.

D8. The encoder of any one of embodiments D1 to D4, wherein the one or more location syntax elements comprises one or more syntax elements specifying the distance between the bottom-right corner of the current partition and a point B where point B is determined by previously signaled rectangular partitions.

D9. The encoder of any previous embodiments, wherein a stack data structure is used for determining the position of rectangular partitions in the picture.

D10. The encoder of any one of embodiments D1 to D8, wherein an array data structure is used for determining the position of the rectangular partitions in the picture.

D11. The encoder of any one of embodiments D1 to D8, wherein a recursive method is used for partitioning the picture into rectangular partitions.

D12. The encoder of any one of embodiments D5 to D8, the encoder further adapted to: initialize a list L of size N, wherein list L comprises N entries, wherein each entry in list L corresponds to a tile in the picture and the one or more entries are arranged in raster scan order such that the n-th entry in L corresponds to the n-th tile in the picture in raster scan order, and wherein each of the N entries in list L is initialized to a value representing that the corresponding tile does not belong to a partition; derive a top-left position of the current partition, wherein deriving the top-left position of the current partition comprises executing a for loop over the elements in list L until an entry with a value representing that the corresponding tile does not belong to a partition is found; identify tiles included in the current partition using the derived top-left position and the bottom right location; and update the list L such that entries in list L that correspond to the tiles that belong to the current partition are set to a value representing that the corresponding tile does belong to a partition.

D13. The encoder of any previous embodiments, wherein the position of a bottom-right corner of rectangular partition i in the picture is restricted to a rectangular area defined by other rectangular partitions j in the scan order where j<i.

D14. The encoder of any previous embodiments, wherein the width and height of rectangular partition i in the picture is restricted to a rectangular area defined by other rectangular partitions j in the scan order where j<i.

D15. The encoder of any previous embodiments, wherein the address or the location of the bottom-right corner of rectangular partition i in the picture is restricted to a subset of the addresses defined by other rectangular partitions j in the scan order where j<i.

D16. The encoder of any one of embodiments D1 to D7, wherein the spatial partition structure is signaled by one or more syntax elements specifying the distance of the bottom-right corner to a point B for each rectangular partition, wherein the point B is fixed.

D17. The encoder of any one of embodiments D1 to D16, wherein deriving a size and/or location for a current partition comprises deriving which tiles in the picture belong to the current partition.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for encoding a picture into a bitstream, the method comprising:
   encoding a tile partition structure as one or more syntax elements in the bitstream;
   determining a number of tiles N in the picture;
   encoding a number of slices in the picture, wherein each slice comprises an integer number of tiles;
   including in the bitstream a first syntax element representing a width of the current slice in number of tiles;
   including in the bitstream a second syntax element representing a height of the current slice in number of tiles;

deriving a top-left position of the current slice as a location of a first tile in raster scan order that is not included in one or more previously derived slices; and using the width, height, and location to encode the picture.

2. A method for decoding a picture from a bitstream, the method comprising:

decoding a tile partition structure from one or more syntax elements in the bitstream;

determining a number of tiles N in the picture;

decoding a number of slices in the picture, wherein each slice comprises an integer number of tiles;

deriving a size for a current slice, wherein deriving the size for the current slice comprises:

deriving a width of the current slice from a first syntax element from the bitstream representing a width of the current slice in number of tiles; and deriving a height of the current slice from a second syntax element from the bitstream representing a height of the current slice in number of tiles;

deriving a top-left position of the current slice as a location of a first tile in raster scan order that is not included in one or more previously derived slices; and using the derived size and location to decode the picture.

3. The method of claim 2, wherein the current slice is a tile group.

4. The method of claim 2, wherein the tile partition structure comprises at least three rectangular slices, wherein at least one boundary of at least one rectangular slice has parts in common with at least two other rectangular slices.

5. The method of claim 2, wherein the one or more previously derived slices were derived in raster scan order.

6. The method of claim 2, wherein a stack data structure is used for determining the position of rectangular slices in the picture, or an array data structure is used for determining the position of the rectangular slices in the picture.

7. The method of claim 2, wherein a recursive method is used for partitioning the picture into rectangular slices.

8. The method of claim 2, wherein deriving a size and location for a current slice comprises determining the tiles in the picture that belong to the current slice.

9. The method of claim 2, wherein the partition structure has, when decoded, each of its entire left boundary and entire top boundary at a picture boundary or a neighboring one or more previously decoded slices.

10. The method of claim 2, wherein syntax elements are not decoded if the current slice is the last rectangular slice in raster scan order.

11. The method of claim 2, wherein deriving the top-left position of the current slice is done without decoding any syntax elements dedicated to indicating the top-left location.

12. A non-transitory computer readable medium storing a computer program comprising instructions which, when executed by processing circuity, causes the processing circuitry to carry out the method of claim 2.

13. A decoder for decoding a picture from a bitstream, the decoder comprising processing circuitry, wherein the decoder is configured to perform a method comprising:

decoding a tile partition structure from one or more syntax elements in the bitstream;

determining a number of tiles N in the picture;

decoding a number of slices in the picture, wherein each slice comprises an integer number of tiles;

deriving a size for a current slice, wherein deriving the size for the current slice comprises:

deriving a width of the current slice from a first syntax element from the bitstream representing a width of the current slice in number of tiles; and deriving a height of the current slice from a second syntax element from the bitstream representing a height of the current slice in number of tiles;

deriving a top-left position of the current slice as a location of a first tile in raster scan order that is not included in one or more previously derived slices; and using the derived size and location to decode the picture.

14. The decoder of claim 13, wherein the current slice is a tile group.

15. An encoder for encoding a picture into a bitstream, the encoder comprising processing circuitry, wherein the encoder is configured to perform a method comprising:

encoding a tile partition structure as one or more syntax elements in the bitstream;

determining a number of tiles N in the picture;

encoding a number of slices in the picture, wherein each slice comprises an integer number of tiles;

including in the bitstream a first syntax element representing a width of the current slice in number of tiles;

including in the bitstream a second syntax element representing a height of the current slice in number of tiles;

deriving a top-left position of the current slice as a location of a first tile in raster scan order that is not included in one or more previously derived slices; and using the width, height, and location to encode the picture.

16. The encoder of claim 15, wherein the current slice is a tile group.

* * * * *

UNITED STATES PATENT AND TRADEMARK OFFICE
CERTIFICATE OF CORRECTION

PATENT NO. : 12,003,718 B2
APPLICATION NO. : 17/437779
DATED : June 4, 2024
INVENTOR(S) : Sjöberg et al.

It is certified that error appears in the above-identified patent and that said Letters Patent is hereby corrected as shown below:

In the Specification

In Column 1, Line 45, delete "(VCC)." and insert -- (VVC). --, therefor.

In Column 3, Line 12, delete "WET" and insert -- JVET --, therefor.

In Columns 3 & 4, in Table, Line 3, delete "pps_seq_parametere_set_id" and insert -- pps_seq_parameter_set_id --, therefor.

In Columns 3 & 4, in Table, Line 21, delete "If( rect tile group flag &&" and insert -- if( rect_tile_group_flag && --, therefor.

In Columns 3 & 4, in Table, Line 22, delete "num tile groups in pic minus1" and insert -- num_tile_groups_in_pic_minus1 --, therefor.

In Columns 3 & 4, in Table, Line 25, delete "top left tile idx[i]" and insert -- top_left_tile_idx[i] --, therefor.

In Columns 3 & 4, in Table, Line 35, delete "num tile_groups_in_pic_minus1; i++ )" and insert -- num_tile_groups_in_pic_minus1, i++ ) --, therefor.

In Column 4, Lines 3-4, delete "single_tile_per_tile_group flag" and insert -- single_tile_per_tile_group_flag --, therefor.

In Column 4, Line 7, delete "num_tile_groups_in_pic_minusl" and insert -- num_tile_groups_in_pic_minus1 --, therefor.

In Column 4, Line 11, delete "single_tile_per_tile_group_fla" and insert -- single_tile_per_tile_group_flag --, therefor.

Signed and Sealed this
Seventeenth Day of September, 2024

Katherine Kelly Vidal
*Director of the United States Patent and Trademark Office*

CERTIFICATE OF CORRECTION (continued)
U.S. Pat. No. 12,003,718 B2

In Column 4, Line 14, delete "top_left tile idx[i]" and insert -- top_left_tile_idx[i] --, therefor.

In Columns 5 & 6, in Table, Line 1, delete "deltaTileIdx[ i ]" and insert -- deltaTileIdx[ i ] --, therefor.

In Columns 5 & 6, in Table, Line 2, delete "NumTileRowsInTileGroupMinusl[ i ]" and insert -- NumTileRowsInTileGroupMinus1[ i ] --, therefor.

In Columns 5 & 6, in Table, Line 2, delete "( deltaTileIdx[ i ]" and insert -- ( deltaTileIdx[ i ] --, therefor.

In Columns 5 & 6, in Table, Line 4, delete "NumTileColumnsInTileGroupMinusl[ i ]" and insert -- NumTileColumnsInTileGroupMinus1[ i ] --, therefor.

In Columns 5 & 6, in Table, Line 5, delete "( deltaTileIdx[ i ]" and insert -- ( deltaTileIdx[ i ] --, therefor.

In Columns 5 & 6, in Table, Line 6, delete "( NumTileRowsInTileGroupMinusl[ i ]" and insert -- (NumTileRowsInTileGroupMinus1[ i ] --, therefor.

In Columns 5 & 6, in Table, Line 7, delete "(NumTileColumnsInTileGroupMinusl[ i ]" and insert -- (NumTileColumnsInTileGroupMinus1[ i ] --, therefor.

In Column 5, Lines 25-26, delete "signalled_tile_group_index length minus1" and insert -- signalled_tile_group_indeX_length_minus1 --, therefor.

In Column 5, Line 28, delete "signalled tile group index length minus1" and insert -- signalled_tile_group_index_length_minus1 --, therefor.

In Column 14, Line 4, delete "are there are" and insert -- area --, therefor.

In Column 16, Line 24, delete "AB" and insert -- $A_B$ --, therefor.

In Columns 17 & 18, in Table, Line 23, delete "~~top_left_tile_idx[ i ]~~" and insert -- ~~top_left_tile_idx[ i ]~~ --, therefor.

In Columns 17 & 18, in Table, Line 24, delete "~~bottom_right_tile_idx[ i ]~~" and insert -- ~~bottom_right_tile_idx[ i ]~~ --, therefor.

CERTIFICATE OF CORRECTION (continued)
U.S. Pat. No. 12,003,718 B2

In Columns 19 & 20, in Table 2, Line 26, delete "(tile group bottom right [ i ]" and insert -- (tile_group_bottom_right [ i ] --, therefor.

In Columns 19 & 20, in Table 2, Line 45, delete "num tile columns )" and insert -- num_tile_columns ) --, therefor.

In Columns 21 & 22, in Table, Line 2, delete "num tiles minus1" and insert -- num_tiles_minus1 --, therefor.

In Columns 21 & 22, in Table, Line 11, delete "num tile columns )" and insert -- num_tile_columns ) --, therefor.

In Columns 21 & 22, in Table, Line 25, delete "num tile columns)" and insert -- num_tile_columns) --, therefor.

In Columns 21 & 22, in Table, Line 28, delete "num tile columns )" and insert -- num_tile_columns ) --, therefor.

In Columns 23 & 24, in Table, Line 23, delete " ~~top left tile idx[ i ]~~ " and insert -- ~~top_left_tile_idx[ i ]~~ --, therefor.

In Column 25, Line 14, delete "top left tile idx[i]" and insert -- top_left_tile_idx[i] --, therefor.

In Columns 25 & 26, in Table 2, Line 8, delete "deltaTileIdx" and insert -- deltaTileIdx --, therefor.

In Columns 25 & 26, in Table 2, Line 9, delete "( deltaTileIdx" and insert -- ( deltaTileIdx --, therefor.

In Columns 25 & 26, in Table 2, Line 9, delete "( num tile columns minusl" and insert -- ( num_tile_columns_minus1 --, therefor.

In Columns 25 & 26, in Table 2, Line 10, delete "( deltaTileIdx" and insert -- ( deltaTileIdx --, therefor.

In Columns 25 & 26, in Table 2, Line 10, delete "( num tile columns minus1" and insert -- (num_tile_columns_minus1 --, therefor.

In Columns 27 & 28, in Table 2, Line 8, delete "(tile_group_height_minus1[ i ]+1 ) *" and insert -- (tile_group_height_minus1[ i ]+1 ) * --, therefor.

In Columns 27 & 28, in Table 2, Line 9, delete "(tile_group_width_minusl[ i ]+1 )" and insert -- (tile_group_width_minusl[ i ]+1) --, therefor.

In Column 33, Line 16, delete "172). cording to" and insert -- 172), according to --, therefor.